United States Patent [19]

Osborn

[11] 4,397,703
[45] Aug. 9, 1983

[54] METHOD AND APPARATUS FOR MANUFACTURE OF LAMINATED REINFORCED FILM

[75] Inventor: Paul V. Osborn, Webster, N.Y.

[73] Assignee: Mobil Oil Corporation, New York, N.Y.

[21] Appl. No.: 307,417

[22] Filed: Oct. 1, 1981

[51] Int. Cl.$^3$ .............................................. B32B 5/12
[52] U.S. Cl. .................................. 156/177; 28/102;
156/179; 156/229; 156/271; 156/290;
156/308.4; 156/436; 156/439; 156/555
[58] Field of Search ............... 156/179, 177, 436, 439,
156/440, 181, 176, 178, 228, 271, 555, 290,
308.4; 28/102, 100; 226/104, 113; 66/84 A

[56] References Cited

U.S. PATENT DOCUMENTS

| | | |
|---|---|---|
| 1,914,801 | 6/1933 | Chadwick . |
| 2,851,389 | 9/1958 | Lappala .................. 154/46 |
| 2,962,080 | 11/1960 | Hirsch .................. 66/84 A |
| 3,156,027 | 11/1964 | Wellman .................. 28/1 |
| 3,169,087 | 2/1965 | Van Ness et al. .................. 156/431 |
| 3,186,893 | 6/1965 | Mercer .................. 161/60 |
| 3,223,761 | 12/1965 | Raley .................. 264/95 |
| 3,272,679 | 9/1966 | Hebberling .................. 156/440 |
| 3,332,823 | 7/1967 | Van Ness .................. 156/427 |
| 3,332,824 | 7/1967 | Sheffield .................. 156/430 |
| 3,414,453 | 12/1968 | Carter .................. 156/426 |
| 3,467,565 | 9/1969 | Utz .................. 156/244 |
| 3,496,053 | 2/1970 | Bascom et al. .................. 428/110 |
| 3,511,739 | 5/1970 | Hebberling .................. 428/108 |
| 3,616,130 | 10/1971 | Rogosch .................. 428/110 |
| 3,686,062 | 8/1972 | Romanin .................. 428/108 |
| 3,805,341 | 4/1974 | Jense .................. 28/102 |
| 3,950,583 | 4/1976 | Patin .................. 428/105 |
| 4,088,805 | 5/1978 | Weigand .................. 428/310 |
| 4,106,261 | 8/1978 | Greenawalt .................. 53/449 |
| 4,161,559 | 7/1979 | Bosse .................. 428/110 |

Primary Examiner—Michael W. Ball
Attorney, Agent, or Firm—Charles A. Huggett; Michael G. Gilman; Frank J. Kowalski

[57] ABSTRACT

A method is described for making a fiber-reinforced composite film sheet (fiber/film laminate) by continuously forming a first planar lap from a plurality of machine-direction (MD) fibers, continuously forming a second planar lap from a single fiber as transverse-direction (TD) reaches which are connected by 180° loops by stretching the fiber between a horizontally diverging pair of chain assemblies, continuously straddling both laps with a pair of co-extruded films which extend sidewardly beyond the loops, vertically converging the films and fibers to form a sandwich, edge sealing the sandwich within strips close to its side edges but inwardly of the loops, lifting the loops from the chain assemblies, sidewardly smoothing and tautening the sandwich, and laminating the sandwich with heat and pressure to form the composite film sheet.

The apparatus for carrying out this method comprises a creel and fiber guides for supplying the MD fibers as the first planar lap; a pair of endlessly revolving roller chain assemblies supporting rows of spindles which are arranged to be initially interwoven, subsequently divergent, and finally in parallel movement to form the second planar lap of TD reaches having their loops over the selectively spaced-apart rows of spindles; at least one bobbin and an engagement support stand for supplying the TD fiber to the initially interwoven spindles; a film storage and feed assembly for supplying the pair of co-extruded films; a film turning and expanding assembly for alignment of the films into straddling relationship to the planar laps of fibers and for sidewise expansion of the films; a converging assembly for arranging the MD and TD fibers and the pair of films to form a fiber/film sandwich; an edge-sealing assembly for heat-sealing the sandwich within a strip which is disposed close to the loops at each edge but inwardly of the loops; a film pickup assembly for lifting the rows of loops from the spindles; an edge puller assembly for smoothing and tautening the edge-sealed sandwich; a laminating assembly for heat sealing the co-extruded films, MD fibers, and TD fiber together to form the fiber-reinforced composite sheet; and a winder for winding the sheet into a roll.

23 Claims, 22 Drawing Figures

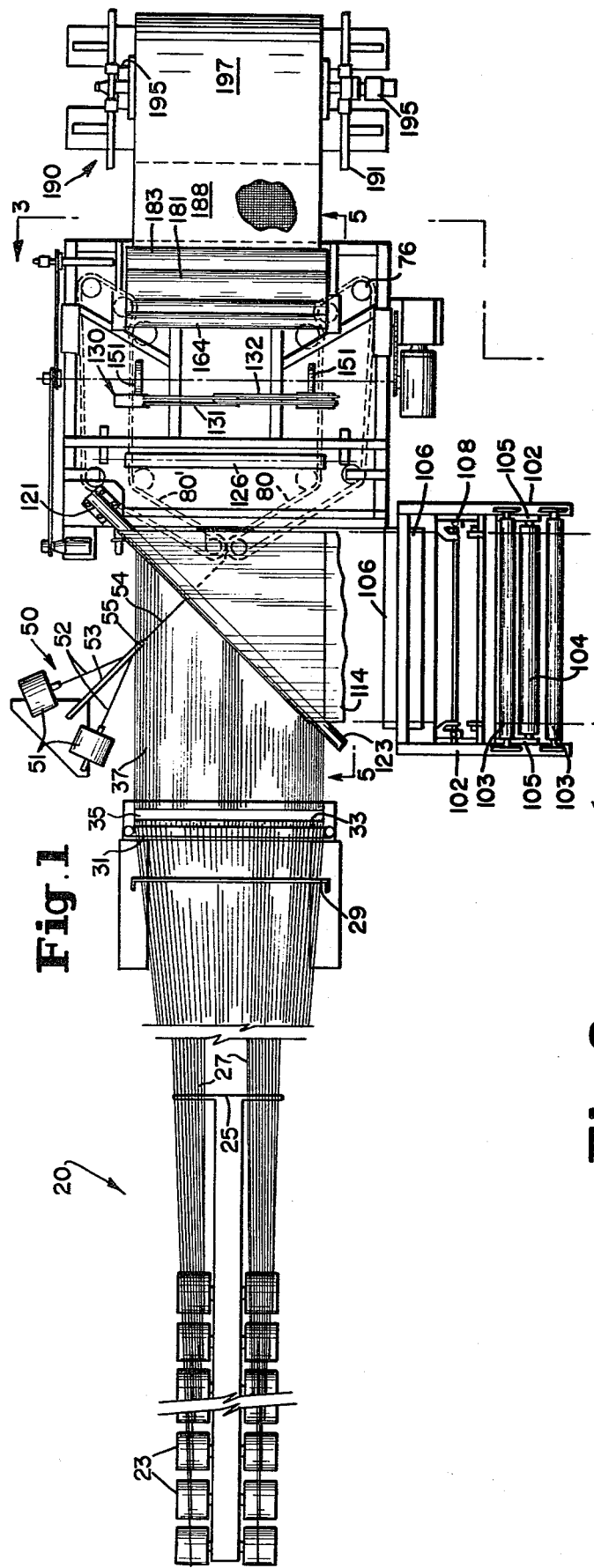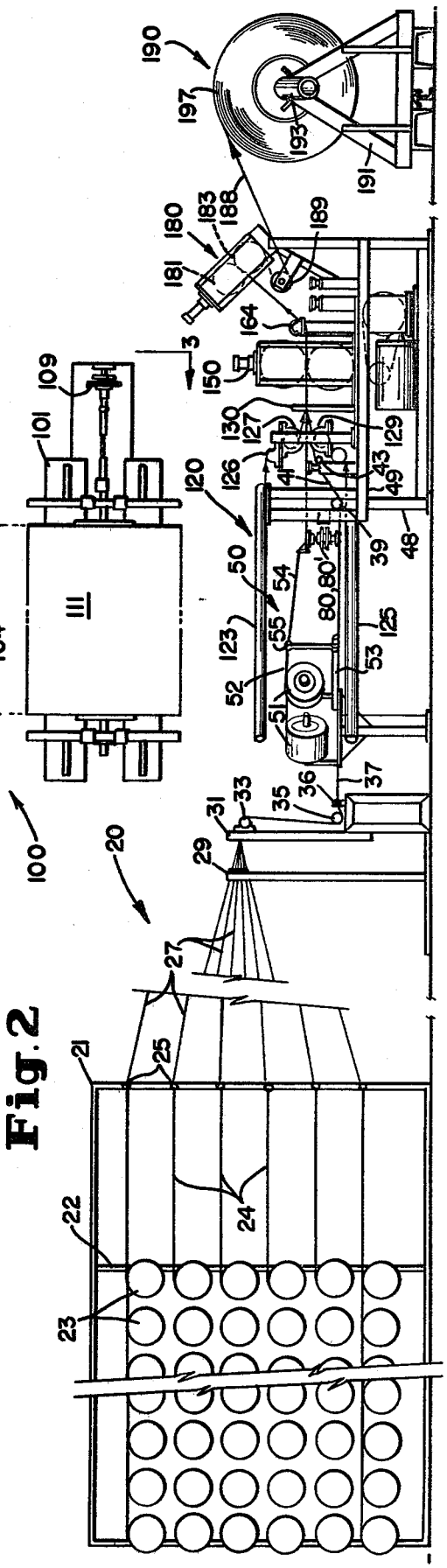

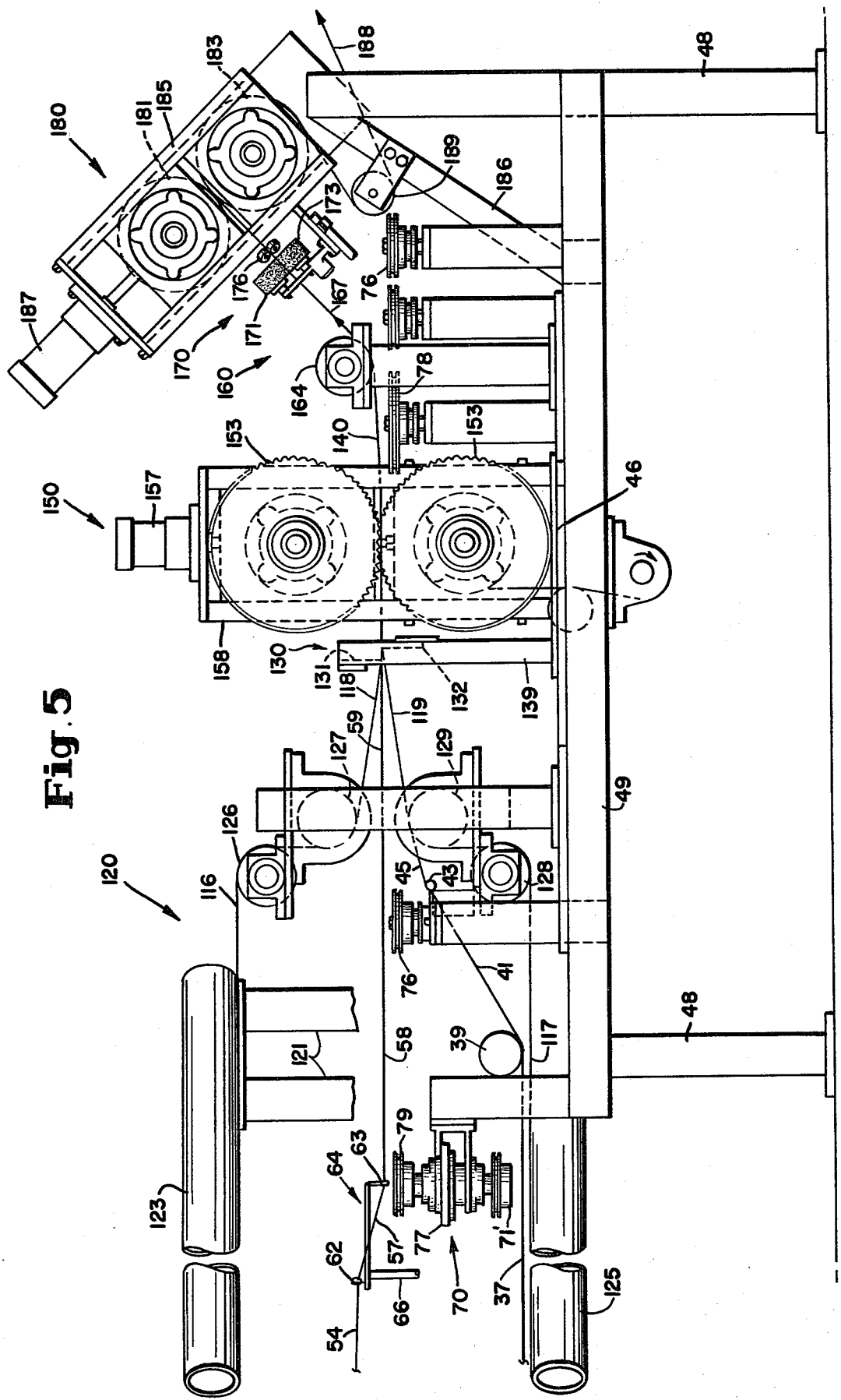

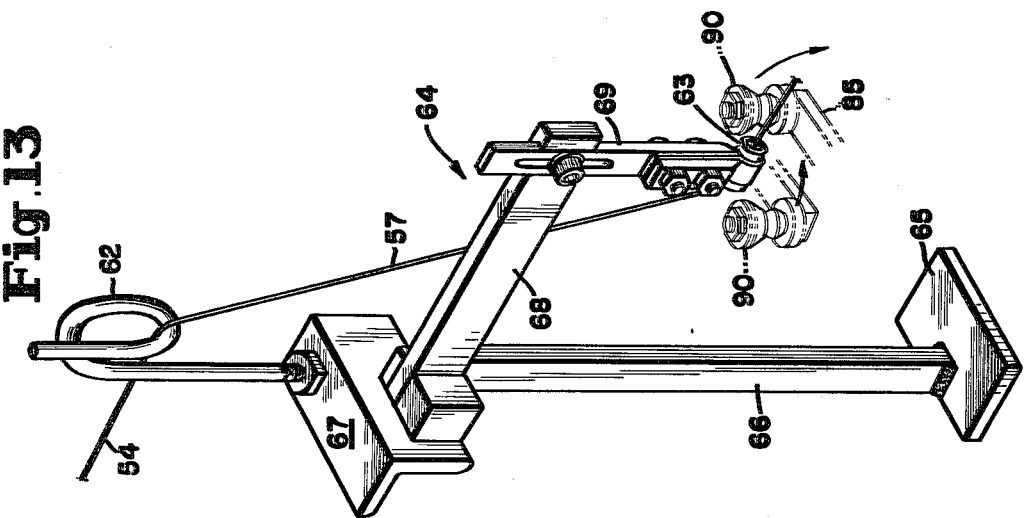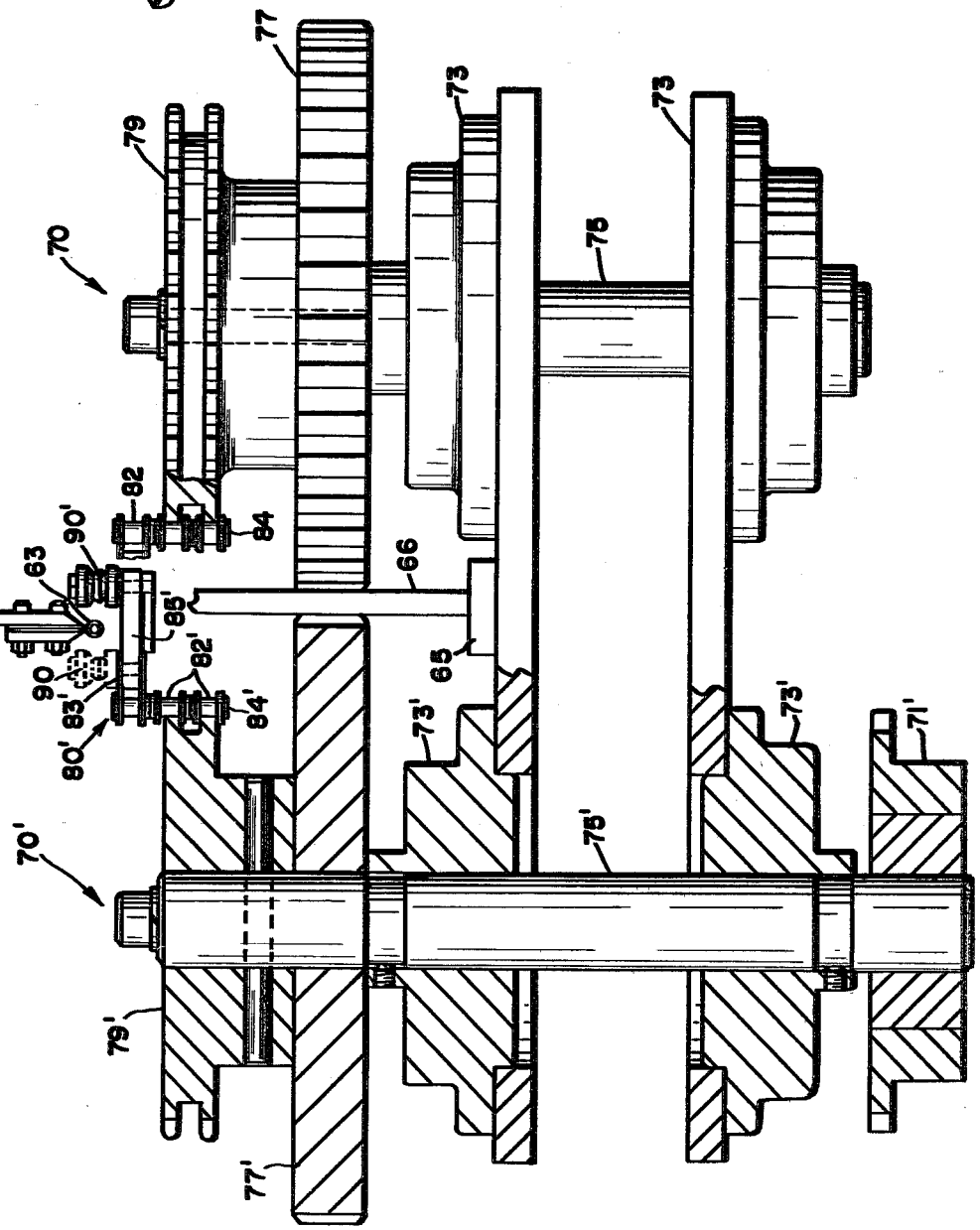

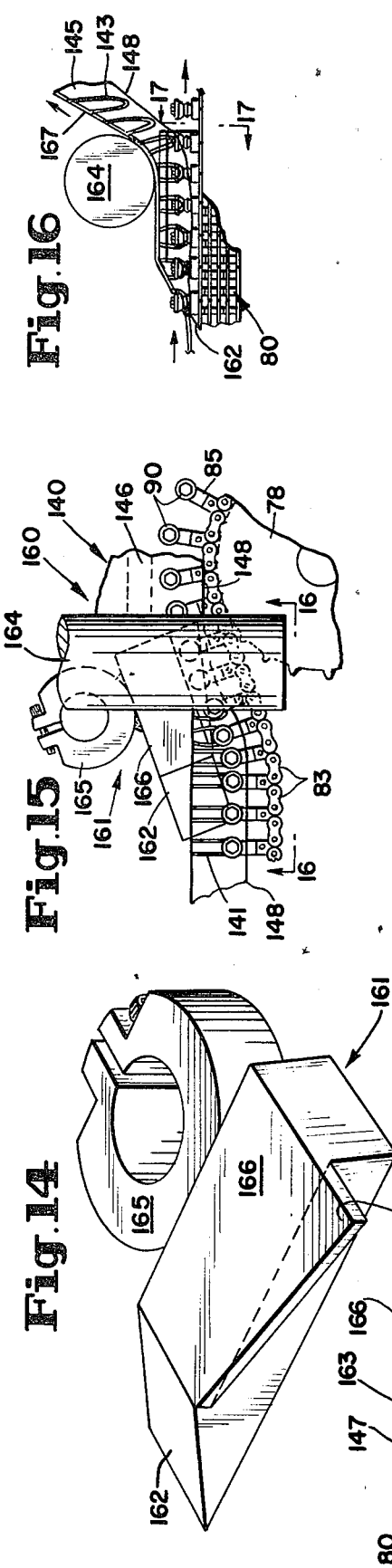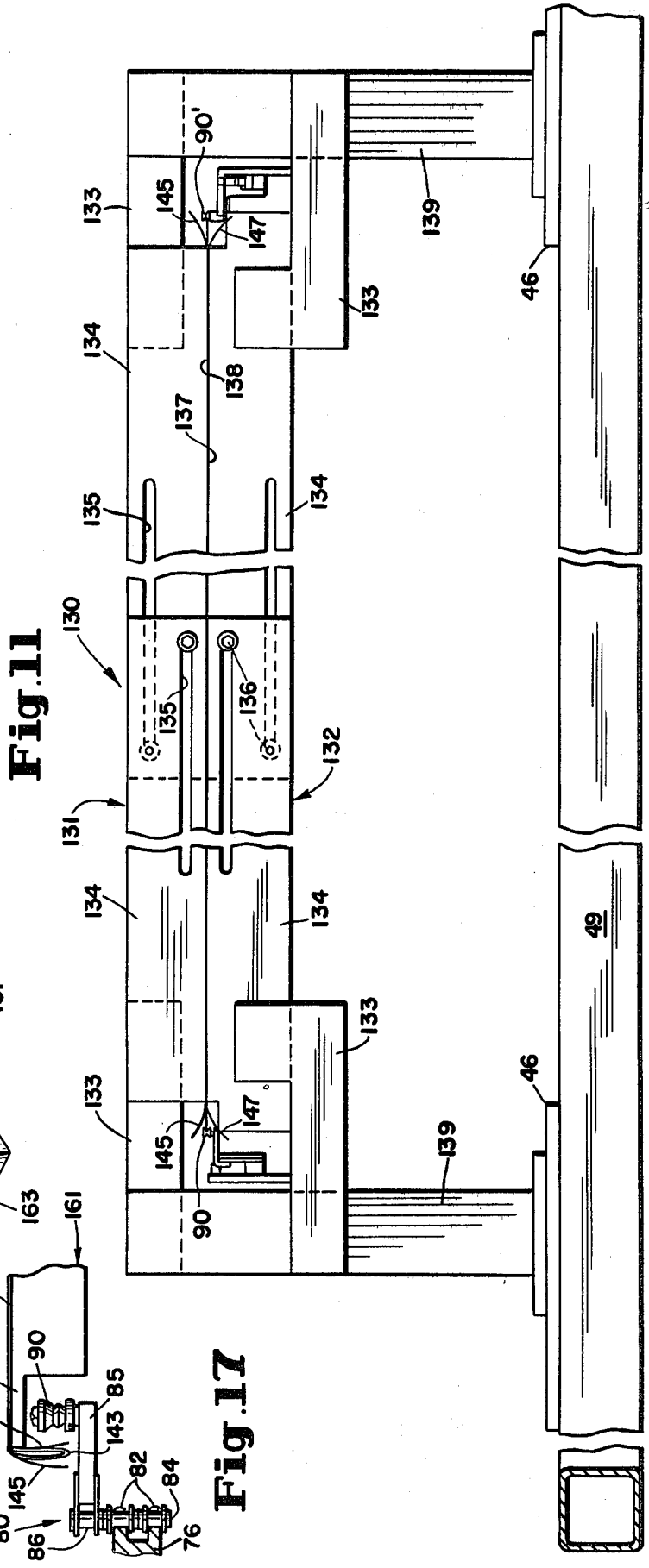

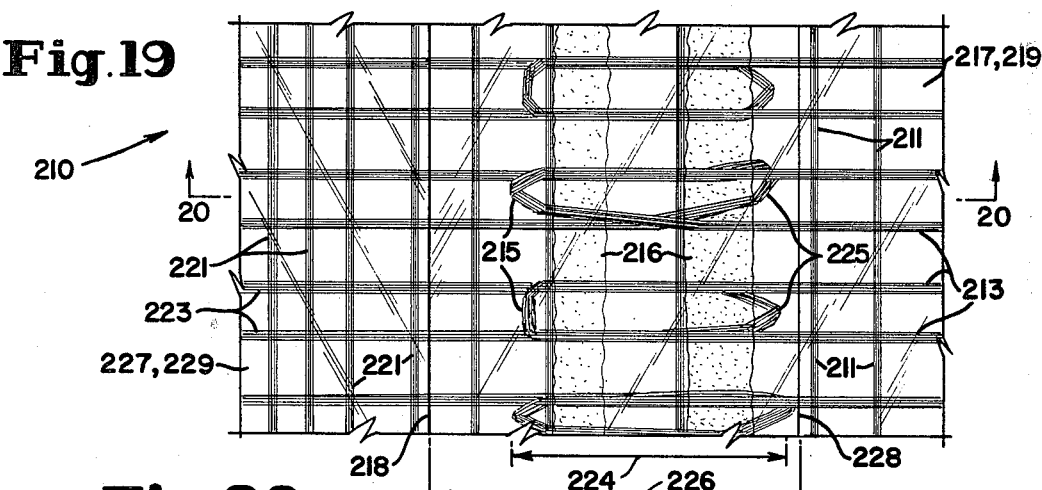
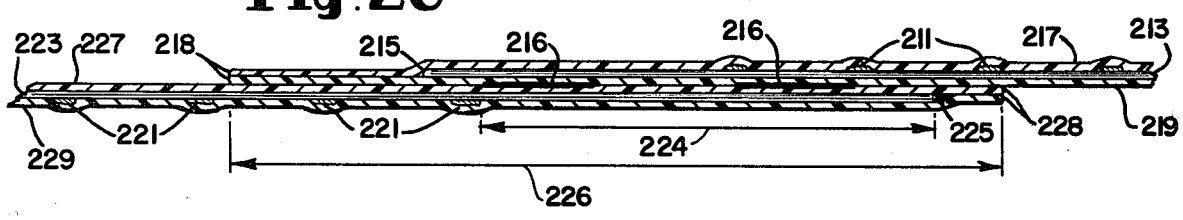
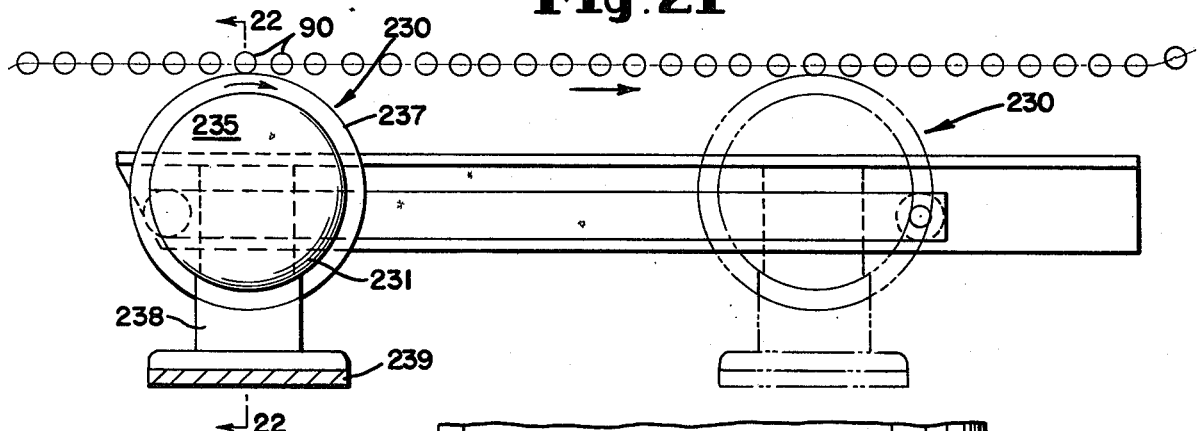
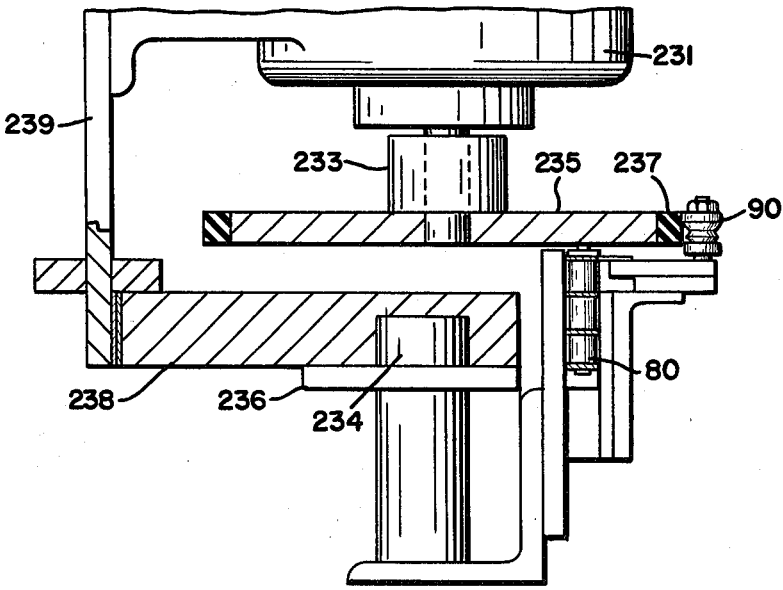

METHOD AND APPARATUS FOR MANUFACTURE OF LAMINATED REINFORCED FILM

BACKGROUND OF THE INVENTION

This invention relates to a method and apparatus for forming a flexible, reinforced plastic sheet material of indeterminate length and more particularly relates to forming a laminated plastic sheet material made from two films of a multi-layer thermoplastic material and a rectilinear web of machine-direction (MD) and transverse-direction (TD) strands or films which are simultaneously laid down between the films.

Shipping sacks are used to store and ship 25–100 pound commodity lots of many diverse materials: for example, grain, cement, fertilizer, peat moss, minerals, chemicals, plastic resins, etc. Bulk sacks are used for shipping and storing much larger quantities of many of these same materials. Among the numerous component materials which are used for such sacks are single-ply 4–10 mil LDPE or LDPE/HDPE co-extruded film and cross-laminated MD-oriented HDPE film. Reinforced composite sheets are also available for such sacks, as described, for example, in U.S. Pat. No. 4,161,559.

Other uses for reinforced composite sheets are coverings for greenhouses, barns, buildings under construction, and commodities which must be stored in the open. The reinforcing material may be in the form of a non-woven or pre-woven scrim or woven mesh material having openings between the strands that are wider in inverse proportion to the severity of the loads to be met. Such a reinforced composite sheet is described in U.S. Pat. No. 3,616,130.

Methods for producing reinforced composite sheets include the layering of a scrim between a pair of flexible films (U.S. Pat. Nos. 3,186,893; 4,088,805; and 4,106,261) and the formation of a woven or non-woven pattern of MD and TD fibers simultaneously with or immediately prior to the layering operation (U.S. Pat. Nos. 1,914,801; 3,169,087; 3,272,679; 3,414,453; 3,496,053; 3,511,739; 3,686,062; and 3,950,583).

Non-woven patterns may be sinusoidal (U.S. Pat No. 1,914,801), MD/TD grid (U.S. Pat. No. 2,851,389), or helical (U.S. Pat. Nos. 3,169,087; 3,272,679; 3,332,823; and 3,332,824). Apparatuses for forming such non-woven patterns include the following diverse arrangements: (a) an endless reciprocating tape and guide bar arrangement for forming a cyclically deposited web (U.S. Pat. No. 3,272,679); (b) a rotary apparatus for winding a helix of strands around a pair of endless carriers having opposed and substantially parallel reaches (U.S. Pat. Nos. 3,332,823 and 3,332,824); (c) a horizontal rotary drum mounted above a rotating table at the top end of a post carrying plastic strands for making laminated webs of filamentary reinforcing material (U.S. Pat. No. 3,414,453); (d) a positioning plate for moving warp strands under tension imparted by creel-and-tension carts about the surface of a cylindrical support while adhesively coated fill strands are wound about the warp strands to form a tubular web of fabric (U.S. Pat. No. 3,496,053); (e) a plurality of strand guide bars carried by a reciprocating tape and operated simultaneously in reciprocating movements, with a phase shift of 180° between the guide bars, to produce an array of reinforcing strands having sinusoidal configurations with multiple overlap patterns (U.S. Pat. No. 3,511,739); and (f) a fixed creel containing reels in two parallel rows making a first lap of warp threads, a rotary creel containing a series of reels spaced apart about the circumference of a coaxial circle, an elongated comb for distributing the warp threads into a plane, a circular plate for winding the weft threads into an annular lap in flattened spirals about the lap of warp threads, and cutters for opening up the annular lap (U.S. Pat. No. 3,950,583).

Co-axially extruding two different thermoplastic materials to form a single annular extruder die to form a duplex film by the blown tube method is described in U.S. Pat. No. 3,223,761 and 3,467,565. Various combinations of polymers and co-polymers in multi-layered duplex plastic sheets, having differing melting points in the inner and outer layers for bonding by heat and pressure to a web of reinforcing material therebetween, are described in U.S. Pat. No. 3,616,130.

Many of these processes produce composite sheet materials having excellent strength properties, but the materials have such excessive thicknesses or the processes operate at such slow speeds or are afflicted with so many maintenance or adjustment problems that costs are excessive. In consequence, shipping sacks made from plastic film have thus far been utilized in a small fraction of the shipping sack/packaging business.

Accordingly, a thinner composite sheet having adequate strength and other physical properties at a basis weight that is at least 30% less than the weight of presently available composite sheets is needed.

A simpler on-machine method and an apparatus for forming a reinforcing grid and for bonding the grid to the film on either side thereof to form the thinner composite sheet at lower cost are equally needed.

Additionally, a method of bonding this novel sheet along the edges thereof to form a tubular article, in order to retain the desirable properties of central portions of the sheet, is also desirable in order to obtain shipping sacks with uniformly suitable properties.

It is therefore an object to provide a composite film sheet of indeterminate length, having a selectively high strength at a basis weight which is approximately 30% less than that used in shipping sacks at the present time.

It is also an object to provide a composite film sheet comprising two films and a reinforcing grid in which the transverse-direction film is continuous, is in parallel reaches at a selected spacing between the reaches, and has 180° loops connecting the ends of the reaches and disposed entirely within and between the films.

It is additionally an object to provide a grid of machine-direction fibers, having a selected first strength/weight ratio and a selected first spacing between the filaments, and a single transverse-direction fiber which has a selected second strength/weight ratio and is disposed transversely and adjacent to the machine-direction fibers as parallel reaches which: (1) are connected sequentially by loops, (2) have a selected second spacing between the reaches, and (3) are bonded to the MD fibers.

It is further an object to provide a fiber-reinforced composite film sheet of indeterminate length, comprising a pair of co-extruded film sheets which are disposed in straddling relationship to the MD fibers and TD fibers so that each film sheet comprises an outer layer having a low softening temperature, whereby the pairs of film sheets, the MD fibers, and the TD fiber are bonded together under heat and pressure.

It is still further an object to provide an fiber-orienting apparatus for continuously forming a single fiber into a plurality of transverse-direction reaches which are connected at the ends thereof by 180° loops.

It is also an object to provide an apparatus for continuously juxtaposing a pair of films, the machine-direction fibers, and the looped transverse-direction fiber into a sandwich.

It is another object to provide a means for removing the loops from the film-orienting apparatus without displacement of the loops and transverse-direction reaches within the film sheets.

In accordance with these objectives and the principles of this invention, a composite film sheet of indeterminate length, having a selectively high strength at a basis weight which is approximately 50% less than that used in shipping sacks at the present time, is provided. This composite film sheet comprises:

A. MD fibers having a selected first strength/weight ratio and a selected first spacing between the fibers;

B. a single TD fiber which has a selected second strength/weight ratio and is disposed within the composite film as parallel reaches which:
  (1) are connected sequentially by loops,
  (2) have a selected second spacing therebetween, and
  (3) are disposed transversely to the MD filaments; and C. a pair of co-extruded film sheets which are disposed in straddling relationship to the MD fibers and the TD fiber so that the loops are enclosed between the film sheets, each film sheet comprising an outer layer having a high softening temperature, and an inner layer having a low softening temperature, whereby the pairs of film sheets, the MD fibers, and the TD fiber are bonded together under heat and pressure.

Preferably, the film sheets are co-extruded, and the inner layers are bonded to both the MD fibers and the TD fiber. If necessary in a particular combination of fiber and film compositions, an adhesive is added to the fibers. It is particularly suitable that such an adhesive be deposited on the MD fibers, such as by coating the fibers before usage thereof. However, it is further within the scope of the invention to coat the film sheets and the TD fiber, alternatively or additionally. It is also a part of this invention to utilize fibers in the form of co-extruded tape, having external layers of low-density polyethylene, whereby no adhesive is needed.

The continuous method of this invention for manufacturing a composite sheet material, having a combination of high strength properties and light weight, comprises the following steps:

A. continuously drawing a plurality of machine-direction (MD) fibers from bobbins within a creel;

B. passing these MD fibers in longitudinally foward movement through a comb and forming a first planar lap of parallel, longitudinally aligned fibers;

C. drawing a single transverse-direction (TD) fiber from a bobbin at a high linear velocity;

D. passing this single TD fiber between spindles within an interweaving section of a pair of endless, spindle-equipped chains which cooperatively comprise the interweaving section, a diverging section, and a parallel section while revolving in opposite directions as a pair of planar patterns which are parallel to the first planar lap;

E. engaging the single TD fiber around the successively interweaving spindles of the spindle-equipped chains to form a successive plurality of closely spaced loops when each spindle of one chain pulls the TD fiber toward and beyond the previously passing spindle of the other chain;

F. laterally extending the single fiber, by longitudinal movement of the inward sides through the diverging section, to separate transversely alternate loops in the plurality of loops and form two rows of loops and a plurality of closed spaced TD fiber reaches which are transversely disposed to the longitudinally aligned MD fibers and connected at ends thereof by the plurality of loops;

G. continuing to move the transversely disposed TD reaches and loops through the parallel section of the pair of chains;

H. drawing a pair of films from a supply thereof;

I. forwardly passing the pair of films in straddling and parallel relationship to the plurality of longitudinally extending fibers and the plurality of transversely disposed fibers;

J. converging the films, the TD reaches, and the MD fibers in to form a fiber/film sandwich;

K. edge sealing the sandwich along each edge but inwardly of the adjacent row of loops;

L. withdrawing the loops from the spindles;

M. transversely stretching the withdrawn sandwich;

N. laminating the longitudinally extending films, the transversely disposed reaches and loops, and the pair of films to form the composite sheet; and O. winding the laminated sheet.

The pair of films are suitably formed by slitting a flattened tube of extruded film, drawn from a roll thereof as the supply of step H, at the sides thereof. If the roll of extruded film is on approximately the same level as the laminating apparatus, each of the films is passed over a turning bar, whereby the drawing of step H and the forwardly passing of step I are perpendicularly related. The films are transversely stretched by passage through a lateral expansion means, after the turning operation.

Laminating the fiber/film sandwich inwardly of the loops, for holding the transversely disposed TD reaches and the MD fibers in place within the sandwich, forms a laminated strip on each side of the sandwich. Such strip laminating is done by two pairs of opposed heated rolls.

The withdrawing of step L is performed by a pair of cams which lift the loops from the spindles. The transverse stretching of step M is performed by transversely disposed rolls having frictional surfaces with respect to the films. The laminating of step N is performed by a pair of heated rolls.

The extruded film is suitably a co-extrusion of high-density and low-density polyethylene. Preferably, the high-density polyethylene is 25% of the film by weight, and the low-density polyethylene is adjacent to the fibers. The fibers are suitably coated with a pressure-sensitive adhesive. The MD and TD fibers may be in the form of monofilaments or may be MD-oriented polypropylene tape. Alternatively, polypropylene tape is extruded with low-density polyethylene, whereby lamination between MD and TD fibers and between the fibers and the film requires no adhesive.

The fiber-reinforced film sheet of this invention generally comprises a non-woven fiber network which is laminated between two layers of co-extruded plastic film. The machine-direction fibers suitably consist of five hundred-denier (0.050-inch wide by 0.002-inch thick) oriented polypropylene tape. The fibers are disposed a suitable distance apart within the first planar lap. This distance apart is in accordance with the strength required for end use of the film sheet. For example, they may be 0.375 inch apart, on centers. The transverse-direction fiber is disposed in a serpentine form, with adjacent reaches of the fiber disposed 0.375-inch apart, also measured on centers, as an exemplary distance apart. The three-eighths inch spacing between MD and TD fibers is one specific example which is widely useful, but many other spacings are feasible and highly suitable for particular applications. The MD fibers and the TD fiber are generally both polypropylene. Polypropylene tape is one highly satisfactory embodiment, but monofilaments and multi-filaments of polypropylene and other high strength polymers can be used to form specific products having certain desired properties.

Polypropylene in the form of tapes, fibers, and filaments which are oriented in the machine-direction for optimum strength properties are well known. When in the form of a single homogenous product that is extruded and drawn from a round die orifice, a monofilament is produced which has high strength (75,000 psi) and medium cost. When extruded from a flat die and slit into narrow widths in the machine-direction and MD oriented, polypropylene tape is produced, having medium strength (50,000 psi) and low cost. This type of polypropylene fiber is the most widely used in the textile industry at the present time. When extruded from a multitude of fine holes (spinerette) and spun into the finished yarn, a multi-filament strand is produced which has a number of fibers in the strand (e.g., 50), producing a yarn of conventional appearance, much greater flexibility than the monofilament, and wider usefulness in regular textile applications. This product has medium strength (45,000 psi) and a higher price than either the monofilament or the polypropylene tape.

The tubular co-extruded film is 1.5 mil thick and comprises 25% high-density polyethylene (HDPE) and 75% low-density polyethylene (LDPE). The collapsed tube is slit at the sides or edges to form the pair of single-layer films. In addition to polyethylene as the raw material for the co-extruded film, liquid or gas barrier materials, such as nylon and films of heavier gauges or lighter gauges, are useful.

A suitable apparatus for manufacturing the fiber reinforced or composite film sheet of the invention comprises:

A. a machine-direction multi-fiber feeding assembly;
B. a transverse-direction single-fiber feeding assembly;
C. a fiber-orienting means for forming the single fiber into a plurality of transverse-direction reaches which are connected by loops at the ends thereof and move in the machine direction at the same speed as do the machine-direction fibers;
D. a film feeding assembly for a pair of co-extruded films of indeterminate length which are arranged in straddling relationship to the MD and TD fibers;
E. a converging assembly for the machine-direction and transverse-direction fibers and the pair of films to form a fiber/film sandwich;
F. a high-temperature nip roll system for laminating the fiber/film sandwich together to form the fiber-reinforced film sheet; and
G. a winder for winding the laminated fiber-reinforced film sheet into a roll.

The apparatus further comprises:

A. a pair of expander rolls for smoothing and widening the pair of films in the transverse direction, prior to reaching the converging assembly; and
B. an edge sealing assembly for heat sealing the pair of co-extruded films of the sandwich to the transverse-direction reaches within a pair of strips which are disposed close to the loops at each edge but inwardly of the loops, whereby the fiber/film sandwich is conjoined within the two strips.

This fiber-orienting means is an apparatus comprising a pair of endless roller chains which are disposed to revolve in a pair of elongated patterns within a common plane. The opposed portions of the patterns move forwardly and comprise an interweaving section, a diverging section, and a parallel section. Each roller chain comprises a triple strand of linked rollers and a row of spindles which are attached to but are laterally offset from the rollers to project outwardly from the pattern.

Each triple strand roller chain comprises pin link plates, roller pins, straight lug link plates, spindle arms attached to the straight lug link plates, and spindles which are rotatably attached to each arm. Each spindle comprises a spindle body having a convex groove for tracking the TD filament. The groove has a crown angle at its center of about 5°. The spindle body further comprises a tapered fiber lift-off surface having an angle of about 45° to the axis of the spindle.

The fiber-orienting apparatus, for producing the TD fiber reaches and loops, more specifically comprises a pair of endless roller chain assemblies which each comprise:

(1) a triple-strand roller chain,
(2) a row of chain attachment plates,
(3) a row of spindle arms, each arm being riveted at one end to one of the attachment plates and extending transversely to the roller chain,
(4) a row of spindles, each spindle being attached to the other end of a spindle arm, and each spindle comprising:
 (a) a central screw and nut which are attached to the arm,
 (b) a spindle shaft which coaxially surrounds the screw,
 (c) a pair of spindle bearings surrounding the shaft, and
 (d) a spindle body having a fiber-supporting portion and a tapered lift-off portion.

The chain system comprises a plurality of spindles lying within a common plane on which the loops are held. For lifting each row of loops from the spindles after passing the edge sealing assembly, a cam means is provided in cooperation with an overlying idler roll which enables the nip rolls to function as an elevating means for directing the fiber/film sandwich obliquely to the common plane in which the spindles revolve.

Two pairs of edge pulling brushes and two pairs of short Mt. Hope rolls are also incorporated into the apparatus in order to stretch the fiber/film sandwich in the transverse direction before reaching the high-temperature nip roll system.

The method for making this fiber-reinforced composite film sheet and the apparatus for carrying out this method are both inherently flexible. The method has flexibility as to adjustable width of the composite film sheet, for example, because the apparatus includes means for selectively moving the pairs of bushing chain assemblies, nip roll systems, loop disengagement devices, and edge pulling devices toward or away from each other. To achieve this flexibility, the idler sprockets on the inner side of the chain loops, the converging assembly, the edge sealing rolls, the loop release cams, the edge pulling brushes, and the tautening rolls are all mounted on a pair of frame plates which are transversely movable relative to the frame of the laminator for changing the width of the composite film sheet without changing the overall pitch length of the chain assemblies.

The method is also flexible as to construction features of the composite film sheet in order to achieve acceptable performance of a film/laminant bag in any specific application by tailoring the strength properties of the composite film sheet so that the bag can pass the requisite performance tests for its type, such as progressive drop, 6-sides drop, and creep. Such construction flexibility can be obtained by using fibers containing various desired proportions of high- and low-density polyethylene, polypropylene, polyamides, polyesters, polystyrene, polyacrylonitriles, polyvinyl chloride, rayon, cotton, wool, and other synthetic and natural fibers, including copolymers, and the like. The denier of the fibers, the center-to-center spacing therebetween, and the adhesive for bonding MD fibers to TD fibers and for bonding both fibers to the films can also be varied. In addition, low-density polyethylene can function as a heat-activated adhesive if co-extruded as the outer layer for a polypropylene fiber core. Futher flexibility of construction can be obtained by varying the type of polymer, its crystallinity, the thickness of the films, and the proportions of polymer types if a layered film construction is selected, such as 25% high-density polyethylene and 75% low-density polyethylene.

The film sheet of the invention may be converted into a tube either by sewing or by hot-melt gluing along the edges, provided that there is sufficient overlapping that the rows of filament loops are in overlying relationship to provide a seam having the equivalent strength of the body of the laminate. This tube may then be fed to a bag-making operation which can produce bags of desired sizes and strength properties by sewing or gluing along the bottom and top edges of the bags.

BRIEF DESCRIPTION OF THE DRAWINGS

FIG. 1 is a plan view of the entire apparatus for making a filament-reinforced film sheet.

FIG. 2 is a right side elevation of the apparatus seen in FIG. 1, taken on the lines 2—2 in FIG. 1.

FIG. 5 is a right-side elevation of the fiber and film feeding, converging, and laminating operations of the apparatus, looking in the direction of the arrows 5—5 in FIG. 1, with the roller chain assemblies removed.

FIG. 6 is a transverse elevation, partially in section, looking in the direction of arrows 6—6 in FIG. 4.

FIG. 11 is a transverse sectional view, showing the convergence assembly for the fibers and films, looking in the direction of arrows 11—11 in FIG. 4.

FIG. 13 is a perspective view of an engagement support stand for the incoming TD fiber.

FIG. 14 is a perspective view of a cam used for lifting the loops from the spindles.

FIG. 15 is a fragmentary plan view of a small section of the chain on the right side of the machine which shows the cam partially beneath the idler roll beneath which the film sandwich passes.

FIG. 16 is a side view of the idler roll, cam, and spindles, as seen in FIG. 15.

FIG. 17 is an end view of the idler roll, release cam, and spindle, showing a filament loop that has been released from its spindle.

FIG. 19 is a plan view of a lap seam which is formed by overlapping opposite edges of a fiber-reinforced composite film sheet and by sealing with two strips of hot melt adhesive so that the loops along the opposite edges coincide with each other.

FIG. 20 is a sectional elevation view of the lap seam shown in FIG. 19, looking in the direction of the arrows 20—20 in FIG. 19.

FIG. 21 is a plan view of an auxiliary spindle drive which is mounted along the inner side of a roller chain within the diverging section thereof.

FIG. 22 is a sectional elevational view of the auxiliary spindle drive of FIG. 21, looking in the direction of the arrows 22—22 in FIG. 21.

DESCRIPTION OF THE PREFERRED EMBODIMENTS

Figure 3:
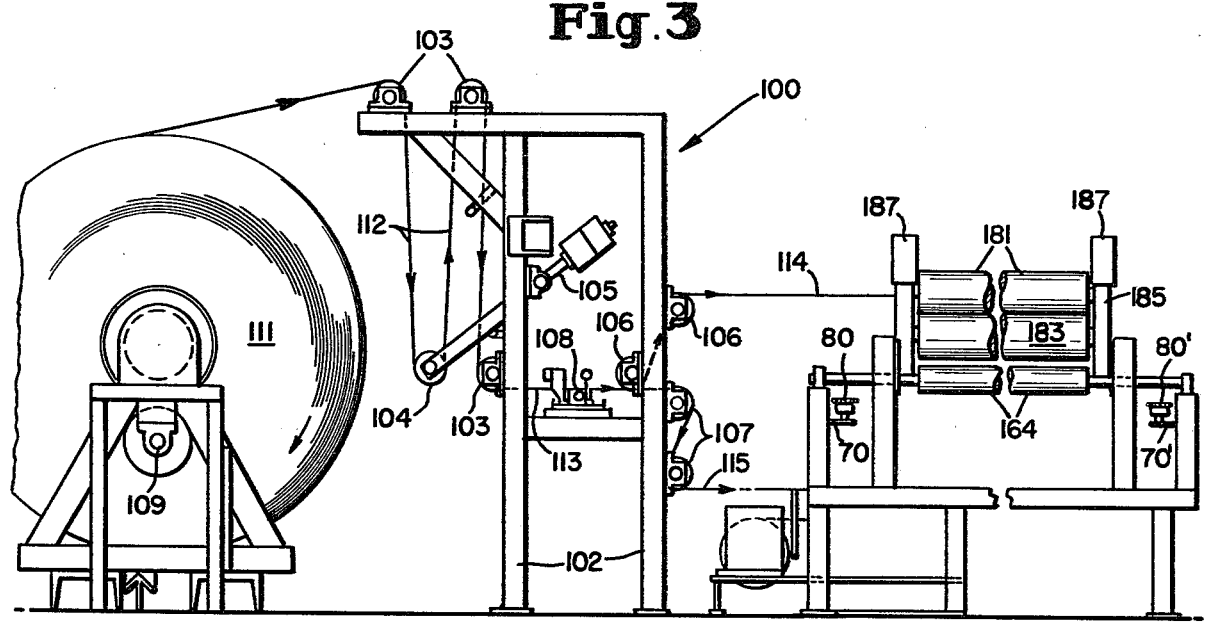
FIG. 3 is a side elevation of the film feeding assembly and laminator of FIG. 1, looking in the direction of the arrows 3—3 of FIG. 1.

The invention may be more fully understood by referring to the drawings in which a useful and operably satisfactory embodiment is shown.

1. Description of the Apparatus

The apparatus of the invention for manufacturing a fiber-reinforced composite film sheet comprises a machine-direction multi-fiber storage and feeding assembly 20, a transverse-direction single-fiber storage and feeding assembly 50; a chain system 80,80' for forming the single fiber into a plurality of transverse-direction reaches which are connected by loops at the ends thereof and moved sidewise in the machine direction at the same speed as the machine direction fibers; a film storage and feeding assembly 100 for supplying a pair of co-extruded films of indeterminate length; a film turning and expanding assembly 120 for aligning and sidewise expanding the films; a converging assembly 130 for arranging the machine-direction and transverse-direction fibers and the pair of films to form a fiber/film sandwich; an edge-sealing assembly 150 for heat sealing the pair of co-extruded films to the transverse direction reaches within a strip which is disposed close to the loops at each edge but inwardly of the loops, whereby the fiber/film sandwich is conjoined within the strips; a film pickup assembly 60 which includes a cam means for lifting each row of loops from the spindles after passing the edge sealing assembly 150 and an elevating means for directing the fiber/film sandwich obliquely to its previous plane of movement; an edge puller assembly 170 for smoothing the sandwich close to its edges and sidewise tautening the sandwich while it continues to move obliquely upwardly; a laminating assembly 180 for heat sealing the co-extruded films, MD fibers, and TD fiber together, whereby the sandwich is converted into the fiber-reinforced composite sheet 200 of the invention; and a winder 190 for winding the laminated fiber-reinforced film sheet into a roll.

The machine-direction fiber storage and feeding assembly 20 is shown in FIGS. 1 and 2 and comprises a creel 21 supporting a large number of MD bobbins 23, a guide 22 on creel 21, an MD fiber break detector and stopping device 25, an eyeboard 29, an idler roll support 31, an upper idler roll 33, a lower idler roll 35, a first set of MD fiber guides 36, a third idler roll 39, and a second set of MD fiber guides 43.

Figure 7:
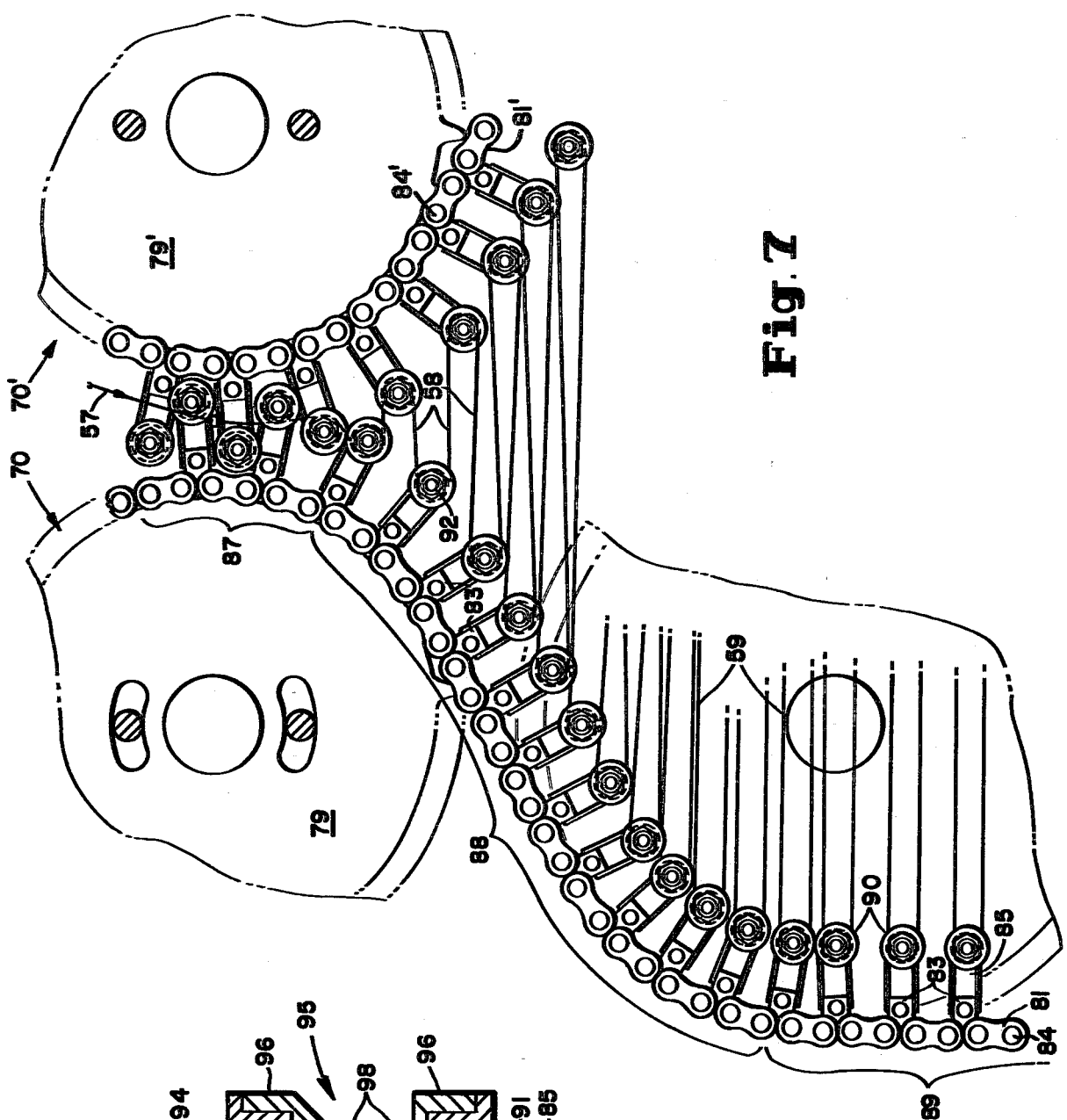
FIG. 7 is a plan view of a portion of the chain system which shows the interweaving section, the diverging section, and a portion of the parallel section thereof, showing the TD fiber being drawn into the weaving section, spread into transverse TD reaches in the diverging section, and moving in the machine direction of the parallel section thereof.

The transverse-direction fiber storage and feeding assembly 50 comprises a pair of TD fiber bobbins 51, which are supported on a support frame 53, and a TD fiber first feed guide 55 which is also supported on frame 53. Associated with TD fiber storage and feeding assembly 50 is a TD engagement support stand 64, shown in perspective in FIG. 13, comprising a base 65 which is attached to such components of the apparatus frame as vertical members 48 and horizontal members 49, as seen in FIG. 2. Support stand 64 also comprises an upright support 66 which is attached to base 65, a laterally adjustable member 67 and a longitudinal member 68 which are attached to the top end of upright support 66, and a vertically adjustable member 69 at the forward end of member 68. Member 69 has jaw supports at its lower end for clamping a TD fiber eyelet 63 which is made of ceramic and is at the same level as spindles 90. Eyelet 63 is so positioned, as seen in FIGS. 6 and 7, that it is disposed between each spindle 90,90' and the roller chain assemblies 80,80' to which the spindle is attached and is also exactly between the shafts of idler sprocket 79 and drive sprocket 79', whereby it is at the point where maximum intermeshing of spindles 90,90' occurs in order to introduce TD fiber reach 57 between spindles 90,90' and above their respective arms 85,85'.

Figure 4:
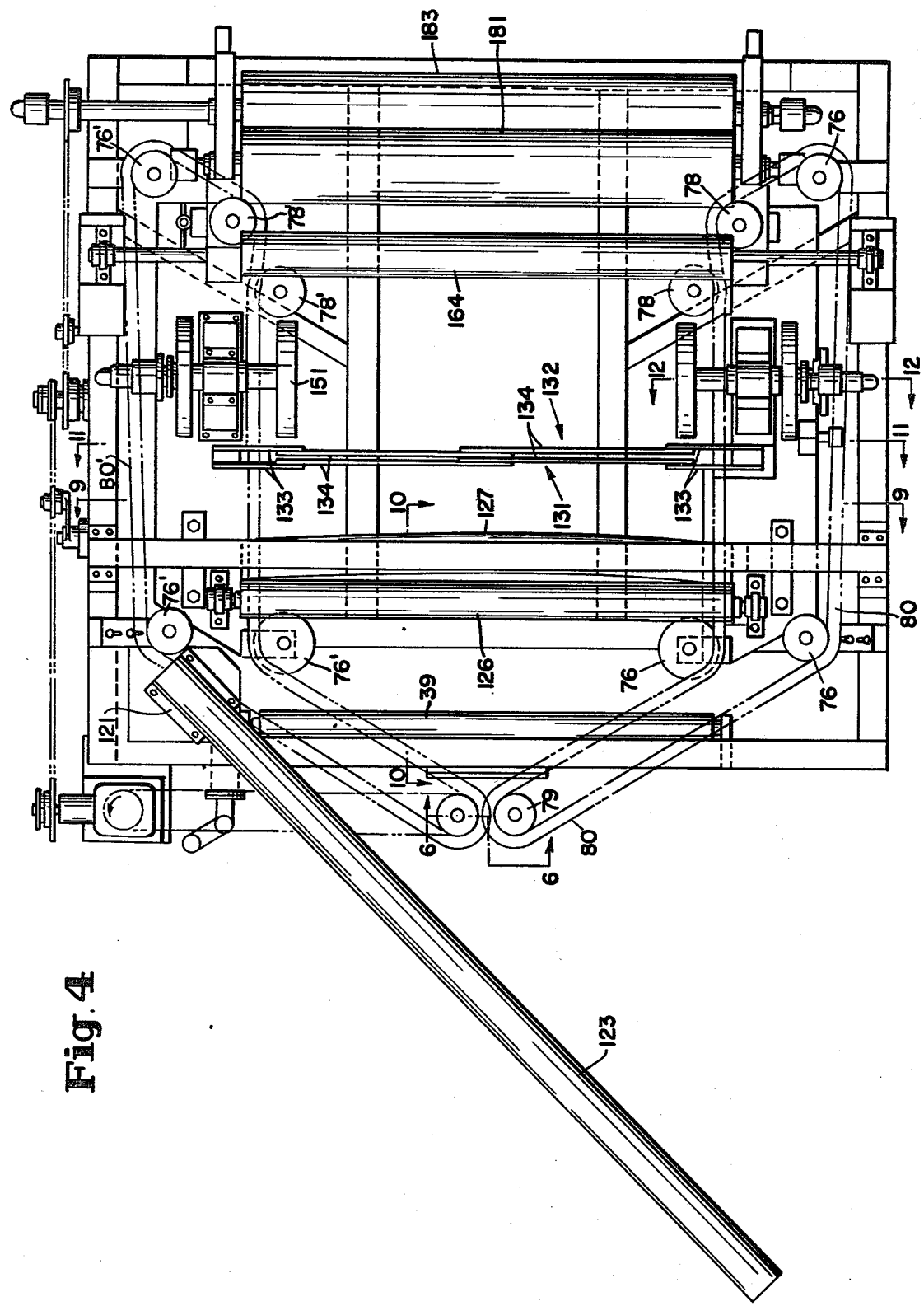
FIG. 4 is a schematic plan view of the fiber and film feeding, converging, and laminating portions of the apparatus, as seen in FIG. 1.

The apparatus further comprises a pair of chain drive and support mechanisms 70,70' and a pair of roller chain assemblies 80,80' for pulling the TD fiber into transverse-direction reaches connected by 180° loops. The drive and support mechanism 70,70' for chains 80,80' comprises a drive sprocket 71' which is visible in FIG. 6, a plurality of bearings 73,73', shafts 75,75', gears 77,77', two pairs of loop fiber relaxation sprockets 78,78', three pairs of idler sprockets 76, and idler sprocket 79 and drive sprockets 79' at the point of intermeshing, as seen in FIG. 4. Sprockets 78 are also idler sprockets.

Figure 8:
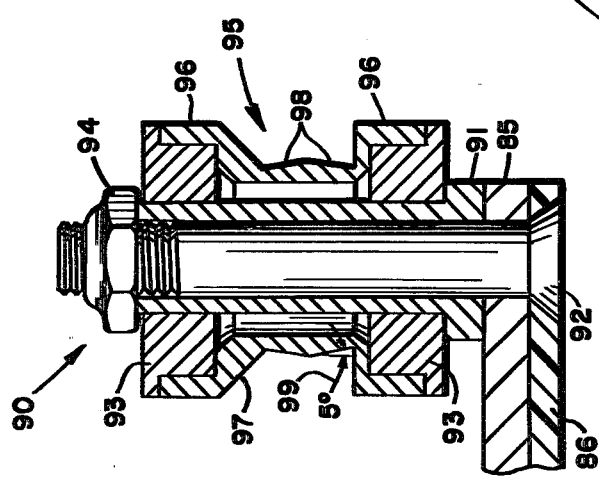
FIG. 8 is a sectional elevation of a single spindle as seen in plan view in FIG. 7.
Figure 9:
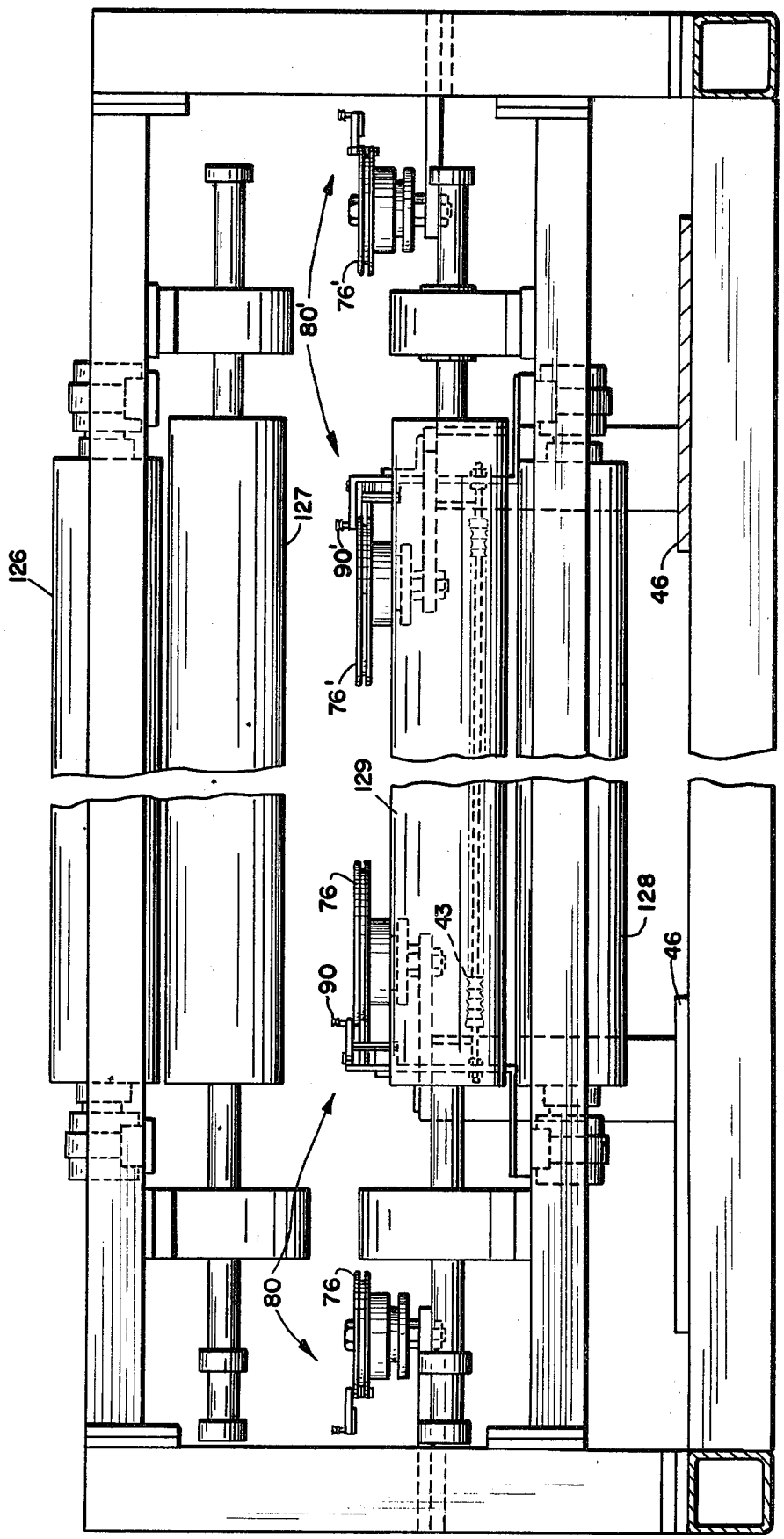
FIG. 9 is a transverse sectional elevation through the apparatus of FIGS. 1 and 2, looking in the direction of the arrows 9—9 in FIG. 4.

The pair of endless roller chain assemblies 80,80' each comprises a triple-strand roller chain 82,82' such as Browning A.S.A. No. 35-3 of the Browning Manufacturing Division of Emerson Electric Co., pin link plates 81,81', roller pins 84,84', straight lug link plates 83,83' such as Browning A.S.A. No. 3-2; spindle arms 85 which are each attached with a rivet to a link plate 83,83' and extend transversely to the vertical row of rollers 82,82', wear strips 86 which are each attached to and underlie a spindle arm 85, and spindles 90,90', each spindle being attached to the outer end of an arm 85, as best seen in FIGS. 6,7 and 8. Each roller chain assembly 80,80' is arranged to revolve endlessly in a planar pattern that is slightly L-shaped so that the two chains in combination form a U, in plan view, which is open toward the discharge end of the apparatus, as shown in FIG. 4.

Each spindle 90 comprises, as can be clearly seen in FIG. 8, a spindle shaft 91, a spindle retaining bolt 92, lock nut 94, a pair of spindle bearings 93, and a spindle body 95 comprising end portions 96, a tapered fiber lift-off surface 97, and a convex groove 98 for tracking the TD fiber. Angle 99 of the crown of groove 98 is about 5°, and the tapered fiber lift-off surface is about 45° to the longitudinal axis of a spindle 90. Spindle shaft 91 and spindle bearings 93 coaxially surround bolt 92.

Viewing FIG. 7 as spindles 90,90' revolve in clockwise and counter-clockwise directions, respectively, it is readily apparent that they move inwardly past one another and leave a space therebetween which permits eyelet 63 to remain in place without contact with contact with spindles 90,90'. As spindles 90,90' continue to revolve, they move outwardly past one another and leave interweaving section 87 just as they begin to engage the TD fiber which is leaving eyelet 63 to form initial TD reaches 58. Spindles 90,90' then move further apart in diverging section 88 and finally move parallel to one another in parallel section 89 of chains 80,80', with facing spindles 90,90' moving in the machine direction, while forming TD reaches 59 which are connected by 180° loops 141 over grooves 98.

An auxiliary spindle drive 230 is shown in FIGS. 21 and 22. An air motor 231 is attached by a shaft to a drive rotor 233 which turns a drive roll 235 having an elastomeric drive surface 237 which contacts the inner sides of spindles 90. Air motor 231 is supported by a base 239 which is attached to an arm 238 and a bar mount 234 which is in turn supported by a clamp and bar support 236.

At least one auxiliary spindle 230 is mounted alongside each diverging section 88, close to drive and support mechanisms 70,70'. Preferably, spindle 230 is disposed at spindle No. 5 (designating spindle No. 1 as being on the imaginary line connecting shafts 75,75'). A second spindle 230, shown in phantom in FIG. 21, is suitably disposed at spindle No. 25. The spindles are driven by drive surface 237 at a somewhat higher speed than the speeds imparted by the moving TD fiber.

With such a pair of auxiliary spindle drives 230 as helper drives for chains 80,80', a maximum speed of 10-12 feet per minute that was obtained on the laminator at the maximum laminator width setting, as compared to about 4-5 feet per minute with no helper drive. With two auxiliary drives 230 along each diverging section, as shown in FIG. 21, a speed of 35 feet per minute has been achieved at the maximum width setting. It has been found that using a higher speed than these maximum speeds breaks the fiber at its point of maximum tension which is at the maximum divergence point. Additional auxiliary drives 230 may be installed, or a plurality of elastomeric belt drives may be disposed along the entire inner lengths of diverging reaches 88 to impart sequentially greater rotational speeds to spindles 90,90'.

Film storage and feeding assembly 100 comprises a roll support stand 101, a dancer and slitter stand 102, three idler rolls 103 which are supported on stand 102, a dancer idler roll 104 which is supported by a counterweighted arm 105 which is pivotally attached to stand 102, four idler rolls 106,107, a pair of edge slitters 108, and an electromagnetic unwinding brake 109, as may be seen in FIGS. 1 and 3.

Film turning assemblies 120 comprise a support member 121 and two turning bars which are visible in FIGS. 1,2,3,4, and 5 and are disposed horizontally and at 45° to the machine direction. They are upper turning bar 123 and lower turning bar 125 which are attached to support 121. Associated with turning bars 123,125 are a pair of idler rolls and a pair of expander rolls for sidewise stretching of the upper and lower films 114,115. These are an upper idler roll 126, an upper Mt. Hope expander roll 127, a lower idler roll 128, and a lower Mt. Hope expander roll 129 which may be seen in FIGS. 4,5,9, and 10.

Figure 10:
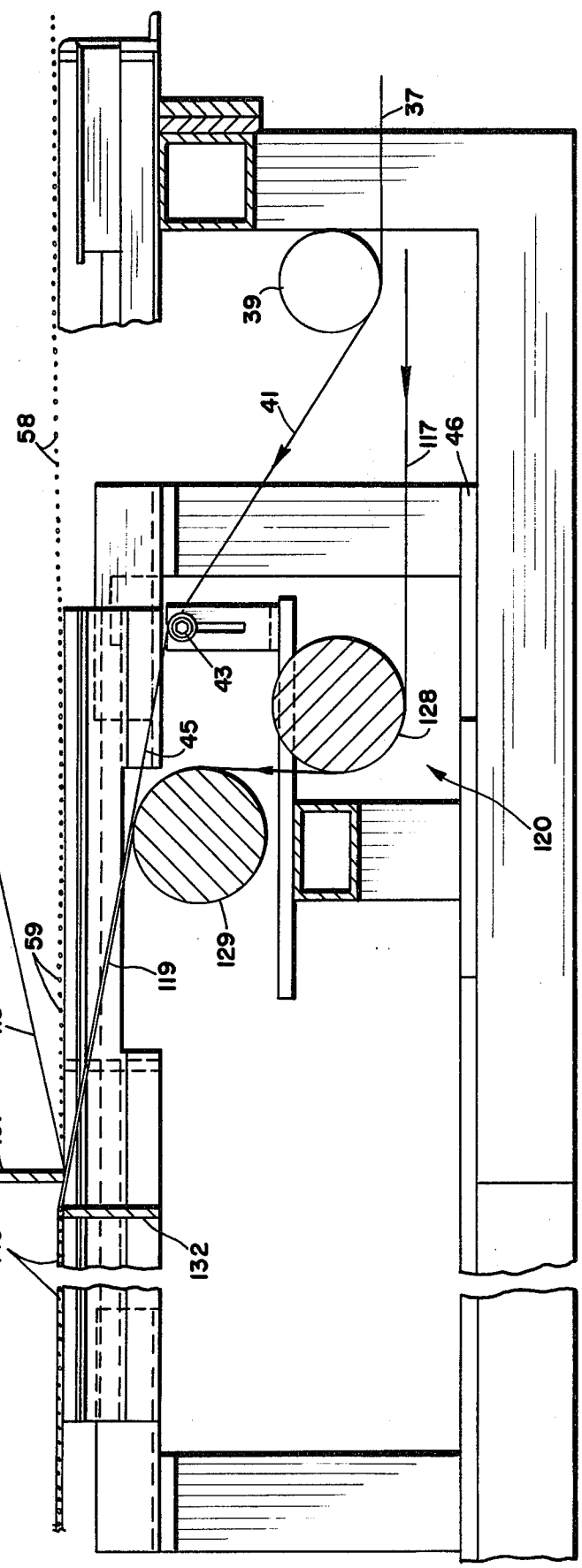
FIG. 10 is a machine-direction sectional elevation through the expander rolls and converence assembly of the apparatus, looking in the direction of arrows 10—10 in FIG. 4.

Convergence assembly 130 is attached, at each end thereof, to a width adjustment plate 46 of the apparatus and comprises an upper edge plate 131, a lower edge plate 132, side supports 133, and support members 139 to which side supports 133 are attached. Plates 131,132 each comprise a pair of sliding members 134, having adjusting slots 135 and bolts 136, as shown in detail in FIG. 11. The lower edge 137 of plate 131 and the upper edge 138 of plate 132 are the functioning members of convergence assembly 130 when upper and lower edge plates 131,132 have been properly adjusted so that there is virtually no horizontal clearance between them, as indicated in FIG. 10.

Figure 12:
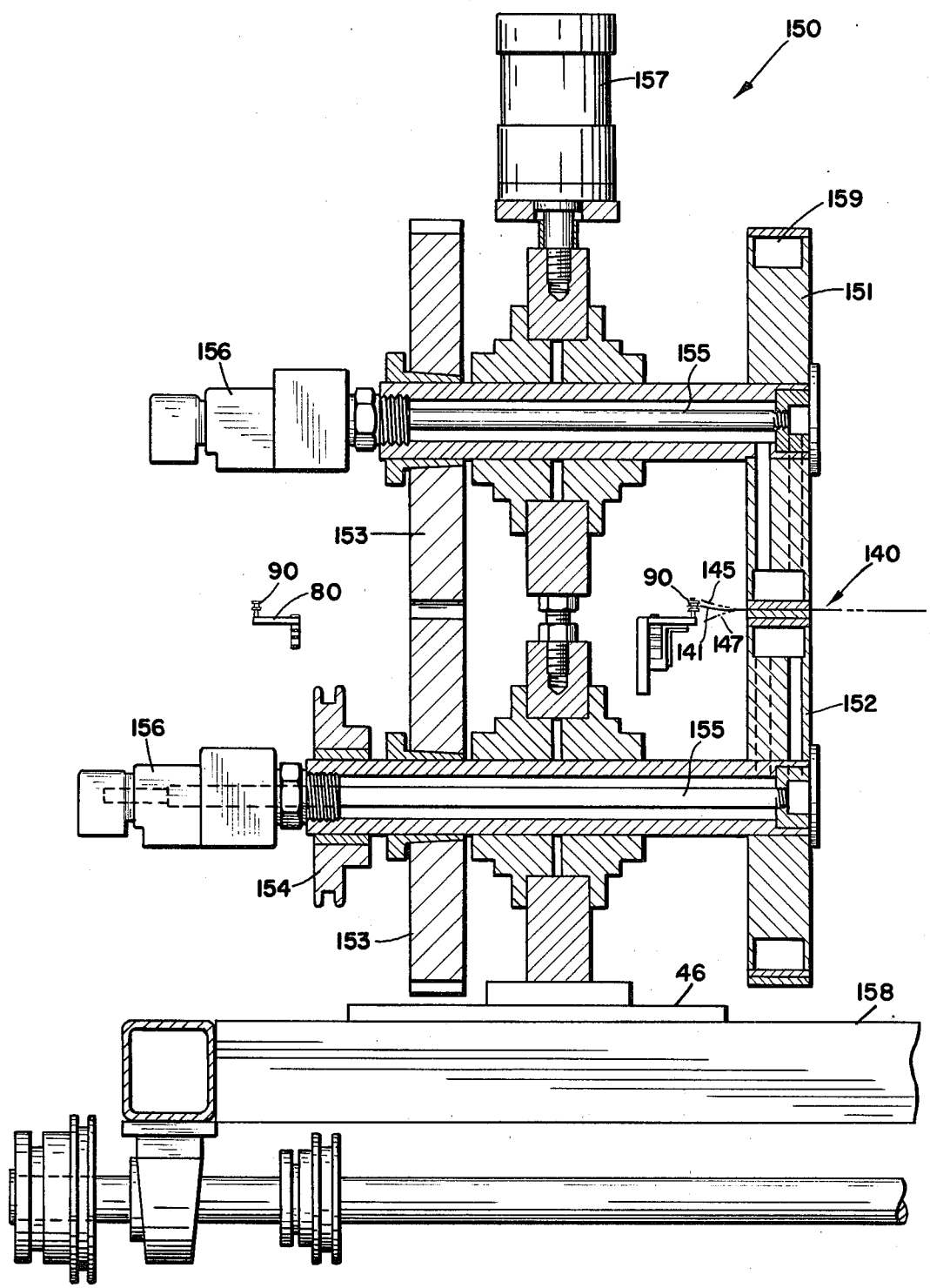
FIG. 12 is a sectional elevation through the edge sealing assembly along the right side of the machine, showing the two layers of film and loops of TD fibers therebetween over the spindles, just beyond the nip of the heat sealing rolls.

Edge sealing assembly 150 comprises, as may be clearly seen in FIG. 12, an upper sealing roll 151, a lower sealing roll 152, a pair of gears 153, a sprocket drive 154, a pair of siphon pipes 155, a pair of rotary couplings 156 which are attached to siphon pipes 155 for circulating hot oil through the unit, and an air cylinder 157 for selectively pressurizing rolls 151 and 152 and for vertically retracting roll 151 from roll 152. The assembly is attached to and supported by a frame member 158 through width adjustment plate 46. Rolls 151,152 contain channels 159 through which the hot oil is circulated from pipes 155.

Film pickup assembly 160 comprises a cam 161 which is visible in perspective in FIG. 14. Cam 161 comprises a ramp 162, a triangular ledge 163, a top surface 166, and a rigidly attached clamp 165 for attaching cam 161 to a cylindrical support member. Film pickup assembly 160 further comprises a pickup roll 164 which is disposed directly above cam 161 so that there is barely sufficient clearance for sliding passage of the edge-laminated sandwich 140 between surface 166 and roll 164, as seen in FIGS. 15-17.

Edge puller assembly 170, as seen in FIG. 5, comprises two pairs of counter-rotating brushes 171,173, two pairs of short Mt. Hope rolls 176, and support stands which are attached to width adjustment plates 46 but are not visible in the drawings. Brushes 171,173 have frictional surfaces which enable them, when counter-rotating, to engage the upper and lower surfaces of the film sandwich and pull the outer edges 148 away from each other, thereby smoothing strips 145,147. Rolls 176 keep the entire sheet in taut condition across its surface before it enters the laminator.

Laminating assembly 180 comprises an upper heater roll 181, a lower heater roll 183, a frame 185 by which rolls 181,183 are rotatively supported, a pair of air cylinders 187 which control the nip pressure between rolls 181,183 and separate rolls 181,183 for thread up of incoming sandwich 140, and an idler roll 189 which is adjustably positioned on a support member 186.

Winder assembly 190 comprises a frame 191, an axle 195, and a drive 193, as seen in FIGS. 1 and 2. A roll 197 of the fiber-reinforced composite film is wound on axle 195 as the apparatus operates.

2. Operation of the Apparatus

In the apparatus shown in FIGS. 1-17, the fiber-reinforced composite film sheet of the invention is formed in four basic steps which are as follows:

A. forming a machine-direction (MD) multi-fiber planar lap 37 by:
  (1) continuously drawing a plurality of machine-direction (MD) fibers 27 from a plurality of bobbins 23, passing these MD fibers in longitudinally forward movement through a guide 22 and eyeboard 29 to converge the MD fibers vertically and spread them horizontally, thereby forming a first planar reach 37 of parallel, longitudinally aligned MD fibers after passing through a guide 36, and
  (2) moving the MD fibers obliquely upwardly as climbing reach 41 and converging reach 45 to reach convergence assembly 130 and become part of sandwich 140;

B. forming a transverse direction (TD) single-fiber planar lap by:
  (1) drawing a single TD fiber from bobbins 51 at a high linear velocity,
  (2) passing this single TD fiber between spindles 90,90' of a pair of endless, spindle-equipped chains 80,80' which cooperatively comprise an interweaving section 87, a diverging section 88, and a parallel section 89 while revolving in opposite directions as a pair of planar patterns which are parallel to the first planar lap,
  (3) engaging the single TD fiber 52 around the successively interweaving spindles 90,90' of the spindle-equipped chains 80,80' to form a successive plurality of closely spaced taut loops 141 when each spindle of one chain 80,80' pulls the TD fiber toward and beyond the previously passing spindle of the other chain 80',80, and
  (4) laterally extending the single fiber 52, by longitudinal movement of chains 80,80' through diverging section 88, for transversely separating loops 141 and forming two rows of loops connecting a plurality of closely spaced TD fiber reaches 58 which are transversely disposed to longitudinally aligned MD fibers 37, and
  (5) continuing to move the TD fiber as transversely disposed TD reaches 59 and loops 141 of a second planar lap through parallel section 89 of the pair of chains 80,80' and into convergence assembly 130 (see FIGS. 7 and 10);

C. straddling the MD and TD laps with a pair of films to form a sandwich 140 by:
  (1) drawing a flattened tube from a supply 111 therefor and cutting its opposite edges with edge cutters 108 to form a pair of films 114,115,
  (2) forwardly passing the pair of films 114,115 as reaches 116,117 in straddling and parallel relationship to TD fibers 58 and MD fibers 41 (see FIG. 5), and (3) converging the films as reaches 118,119 toward TD reaches 59 and MD fibers 45 to form a fiber/film sandwich 140 at convergence assembly 130; and D. laminating sandwich 140, to form the film-reinforced composite sheet of the invention in roll form, by:
(1) edge-sealing sandwich 140 within narrow strips 146 (see FIG. 15), close to each side edge 148 but inwardly of the adjacent row of loops 141 by means of edge sealing assembly 150,
(2) withdrawing taut loops 141 from spindles 90 by means of apparatus 160 to form relaxed loops 143,
(3) transversely smoothing and stretching the withdrawn sandwich 140 by means of edge pulling assembly 170,
(4) laminating sandwich 140, consisting of longitudinally extending fibers 45, transversely disposed reaches 59, released loops 143, and the pair of films 118,119, to form the composite sheet 200 by means of laminating assembly 180, and
(5) winding the laminated sheet composite into roll 197 by means of winder assembly 190.

More specifically, a plurality of MD fibers 24 are drawn from bobbins 23, passed horizontally through guide 22 and break detector 25 and convergingly into eyeboard 29, over idler rolls 33,35, through first set of MD fiber guides 36, and horizontally in the machine direction as parallel reaches 37. As best seen in FIGS. 5 and 10, horizontally moving MD fibers 37 then pass beneath idler roll 39, move obliquely upwardly as reaches 41, go through fiber guides 43, climb more gradually as MD converging reaches 45 in adjacent relationship with lower film 119, and form a part of a sandwich 140 at convergence assembly 130.

The single TD fiber 52 is pulled at a high velocity alternately from the pair of bobbins 51, which are disposed outside of the composite sheet-forming apparatus, through first guide 55. As seen in FIGS. 2 and 13, fiber 52 is then passed obliquely beneath turning bar 123 and above MD fibers 37 as reach 54, then through second TD fiber guide 62 to TD fiber eyelet 63 while moving at an angle to the horizontal of about 20° as descending reach 57 to pass over revolvingly approaching spindles 90,90' which are attached to the pair of chains 80,80'. Immediately after leaving eyelet 63, the TD fiber is between the interwoven spindles 90,90' and the respective roller chains 82,82', as seen in FIGS. 5,6, and 7, within interweaving section 87 of chains 80,80'. As spindles 90 revolvingly disengage from each other in the initial part of diverging section 88, the TD fiber begins to be pulled into lengthening reaches 58 throughout diverging section 88. Then, throughout parallel section 89, reaches 59 of uniform length are formed, each reach 59 being closely spaced and connected at each end by a taut loop 141 around one of spindles 90,90' to the succeeding and preceeding reaches 59.

Fiber 52, as wound on bobbins 51, is suitably coated with a very thin layer of heat-activated adhesive. The preferred fiber-film adhesive is 521GH of Morton Chemical Co., which is applied as a 2% by weight solid solution, using trichloroethane as solvent. This solution is applied on both sides as 21% by wet weight of the fiber and is dried thoroughly before winding onto TD fiber bobbins 51. There is no adhesive action until heat is applied, the coated fiber 52 being fairly slippery over convex surfaces 98 of spindles 90.

Fiber loops 141 are shown in FIG. 12 as sandwich 140 is passing through edge sealing assembly 150. With reference to the right side of the apparatus which is principally illustrated in the drawings, these loops 141 are lifted from spindles 90 by cams 161 while chains 80,80' are slightly approaching one another, as best seen in FIG. 4, while moving past relaxation sprockets 78,78', and as the edge-sealed sandwich is passing beneath idler roll 164 of sandwich pickup assembly 160. Although the released loops 143 and outer edge portions of films 145,147 droop over ledge 163 of cam 161 and tend to hang down while entering reach 167 during upward travel toward laminating assembly 180, as seen in FIGS. 16 and 17, they are smoothed and pulled outwardly by edge pulling assembly 170, as seen in FIG. 5.

As seen in FIG. 3, the collapsed tube of co-extruded film is pulled from a roll 111 on film support stand 101 and passed over first idler roll 103 to a tension adjusting means comprising counter-weighted arm 105, which is pivotably supported on dancer and slitter stand 102, and dancer idler roll 104. The flattened tube therefore leaves roll 111, passes over first idler roll 103, dancer idler roll 104, and second idler roll 103, whereby tension may be sensed and vertical tensioning reaches 112 may be adjusted by movement of arm 105. The flattened roll of film then passes under third idler roll 103 to edge slitters 108 as horizontal reach 113. The edges of the tube are slit in each apparatus 108 to form upper and lower films. The upper film then passes under and over rolls 106 to form upper reach 114, and the lower film passes over and under rolls 107 to form lower reach 115. Both reaches 114,115 pass through film turning assemblies 120.

Specifically, as seen in FIG. 5, the upper film passes over and then under upper turning roll 123 and leaves as reach 116 which is oriented at 90° to reach 114. The upper film then passes over idler roll 126 and under expander roll 127 as slightly descending reach 118. The lower film passes under and then over turning roll 125 and proceeds as reach 117 to lower idler roll 128 and then over expander roll 129 as slightly ascending reach 119. The relationship of the lower film in reaches 117 and 119 to idler roll 128 and expander roll 129 may also be clearly viewed in FIG. 10.

Returning to FIG. 5, film reaches 118,119, MD fiber reaches 45, and TD fiber reaches 59 converge into a single sandwich 140 at convergence assembly 130 which is shown in section in FIG. 10 and in front elevation in FIG. 11. The films and fibers pass through the slot formed by the separated plates 131,132, beneath lower edge 137 and above upper edge 138, respectively, of edge plates 131,132 to form a closely juxtaposed sandwich 140 which proceeds to edge sealing assembly 150, as seen in FIG. 12.

Operation of edge sealing assembly 150 creates a thin seal strip 146 along each edge of sandwich 140 but inwardly of tensioned loops 141 which are around spindles 90. A seal strip 146 is visible in FIG. 15.

Consulting FIG. 2, it is apparent that sandwich 140 moves from edge sealing assembly 150 to film pickup assembly 160 which is shown in detail in FIGS. 14-17. Chain assemblies 80,80', as shown in FIGS. 1 and 4, move slightly inwardly toward each other while passing between relaxation sprockets 78,78'. At this point, cams 161 are beneath sandwich 140 and idler roll 164 is directly thereabove. The relaxed sandwich 140 is then lifted on each side by ramp 162 of each cam 161 so that relaxed loops 143 are progressively lifted past tapered lift-off surfaces 97 of spindles 90, while passing over top surfaces 166 of cams 161 and while being progressively raised by outwardly sloping ledges 163 of cams 161, until they hang down between edge film strips 145,147, as seen in FIGS. 16 and 17. Cams 161 and relaxation sprockets 78,78' therefore function, in combination, as loop disengagement devices for taut loops 141, and roll 164, in combination with the elevated position of laminating assembly 180, functions as a pick-up device for sandwich 140, whereby the edge-sealed film sandwich can travel diagonally upwardly as reach 167. As seen in FIG. 15 in combination with FIG. 5, while sandwich 140 moves obliquely upwardly as reach 167 toward the laminator, edges 148 extend beyond relaxed loops 143.

En route to laminator 180, sandwich reach 167 is acted upon by edge puller assembly 170 which is visible in FIG. 5. Counter-rotating brushes 171,173 engage the outer portions of sandwich 140 and pull strips 145,147, with relaxed loops 143 therebetween, outwardly while straightening out wrinkles in edge strips 145,147. Disposed along each edge of reach 167, between brushes 171,173 and laminator 180, are a pair of short Mt.Hope rolls 176. These rolls 176 are visible only in FIG. 5. They are disposed at about 10° to the machine direction and tauten the entire sandwich 140 transversely, just before it enters laminating assembly 180.

While passing through laminating assembly 180, the entire sandwich 140 is softened by heat and pressure so that both films and both fibers are laminated together between rolls 181,183 to form the integral fiber-reinforced composite sheet 200 which next passes under lower roll 183 and over selectively positioned idler roll 189 to leave laminating assembly 180 as reach 188 which then proceeds, as seen in FIGS. 1 and 2, to winding assembly 190.

In winding assembly 190, reach 188 is wound into a product roll 197 of a fiber-reinforced composite film sheet 200 which can be stored and processed as desired to make shipping bags and bulk bags of any required strength and size characteristics. The width of sheet 200 can also be adjusted within selected limits without changing the overall pitch length of chain assemblies 80,80'. Such flexibility for width adjustment is an important requirement because of the varieties of bag widths that are used in the shipping sack industry. To achieve this flexibility, idler sprockets 78,78' and 76,76' on the inner sides of chain assemblies 80,80', each end of convergence assembly 130, each pair of edge sealing rolls 151,152, each loop release cam 161, each pair of edge pulling brushes 171,173, and each pair of Mt. Hope tautening rolls 176 are all mounted on a single pair of horizontally and longitudinally disposed frame plates 46 which are slotted and adjustably attached to horizontally frame members 46 by bolts 44. The width adjustability that is achievable by sideways movement of these plates 46 can best be understood by referring to FIGS. 9,11, and 12.

The four edge sealing rolls 151,152 and the upper and lower laminating rolls 181,183 are generally heated by a hot oil system which utilizes a heating oil such as Dowtherm A. A suitable heating and circulating system for this material comprises a storage tank containing the Dowtherm A, a pump for circulating it, a heater, and a piping system for passing it through the heater into all four edge sealing rolls in parallel, into the laminating rolls in series, and back to the tanks. The system operates at about 30 psi. The edge sealing rolls are each about 12 inches in diameter and about two inches in width.

Figure 18:
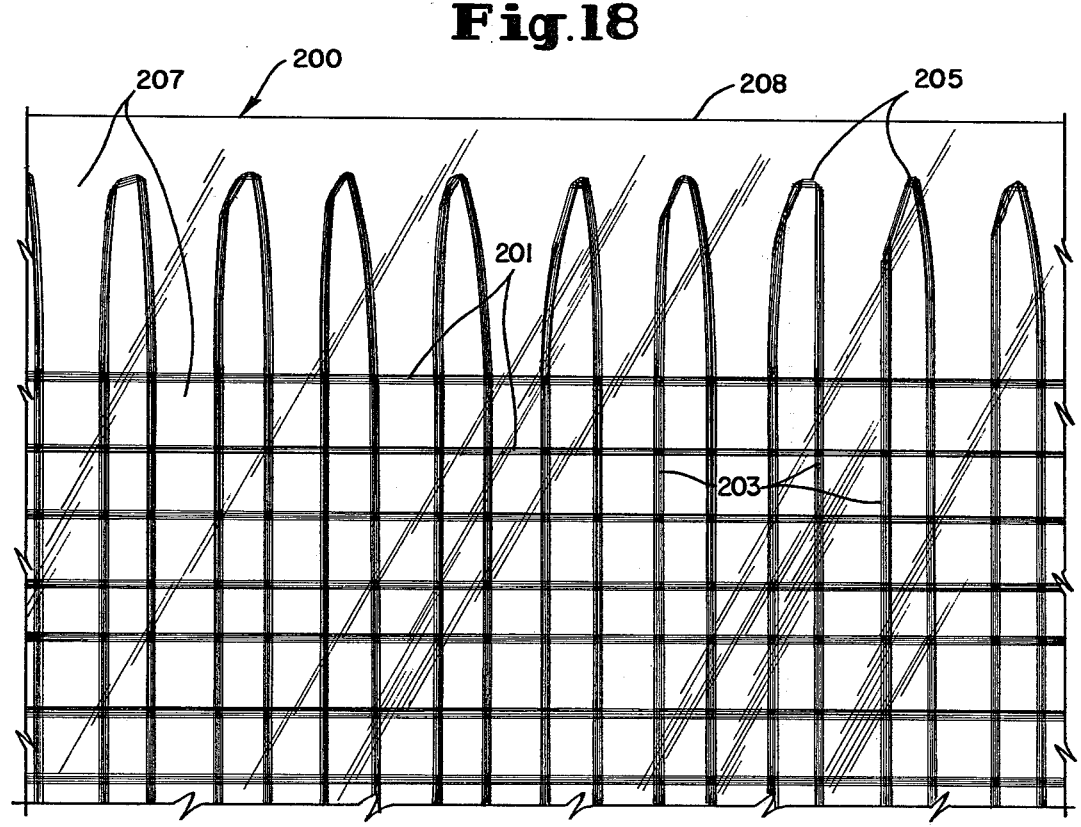
FIG. 18 is a plan view of a portion of a filament-reinforced composite film sheet (for brevity, sometimes called a fiber/film laminate), after manufacture in the apparatus of FIG. 17.

The resulting fiber-reinforced composite film sheet 200 is shown in FIG. 18 in plan view. MD fibers 201, TD reaches 203, TD loops 205, and both films 207 form a selectively strong product having one-fourth the weight, much greater water resistance, improved tear and impact properties, and greater grease resistance as compared to a comparable product of paper construction. This composite sheet also has one-half the weight, the ability to utilize a sewn closure, breathability at the cost of minimal loss of strength, better strength and tear properties, more stiffness with no opening problems, hot filling capabilities, grease-proofness, and better resistance to finger puncture as compared to comparable products of plastic construction.

These comparisons are made for a fiber-reinforced composite film sheet having a total average thickness of 2.5 mil, utilizing 0.25 mil high-density polyethylene and 0.75 mil low-density polyethylene in combination with 500 denier polypropylene tape as both machine-direction and transverse-direction fibers. This composite film sheet derives a part of its novel strength properties from the 180° loops 205 being entirely within and between the films 207 whenever its usage requires conjoining the edges of a single sheet as a lap seam to obtain greater width, as for making a bulk bag, or to produce a tubular bag, such as a shipping bag.

3. Manufacture of a lap seam.

Such a lap seam 210, with loops 215,225 in overlapping relationship, is shown in plan view in FIG. 19 and in section in FIG. 20. MD fibers 211 form a grid with TD reaches 213, and both fibers 211,213 are between and laminated to films 217,219 of the upper composite film sheet. MD fibers 221 form a grid with TD reaches 223, and both fibers 221,223 are between and laminated to films 227,229 of the lower composite film sheet. Loops 215 are inside edges 218 of upper films 217,219, and loops 225 is inside edges 228 of lower films 227,229. Loop overlap 224 is generally about 1.0-1.5 inches and preferably about 1.0 inch. Edge overlap 226 is generally 1.5-2.5 inches, preferably about 1.5 inches. Adhesive strips 216 are between films 219,227 and substantially coincide with loops 215,225.

4. Manufacture of shipping bags.

The fiber-reinforced composite film sheet or fiber/-film laminate 200 of this invention is believed to be a bag-making material having exceptional design flexibility for meeting a very wide variety of market needs. A number of diverse bags are accordingly manufactured and tested to meet such needs by forming various selected fiber-reinforced composite film sheets of the invention into tubes of indefinite length, having lap seams as illustrated in FIGS. 19 and 20. The tubes are then cut into required lengths and sewn at bottom and at top ends after filling with selected test materials, as described in the following examples.

EXAMPLE 1

Bags made of 3 ply-50 lb. paper and 5 to 6 mil low density polyethylene (LDPE) are used in the marketplace for shipping and selling 50 lbs. of such squashy products as mulch and some fertilizers. A fiber/film laminate bag is produced from a 2.5 mil fiber/film composite sheet 200 which is formed from 2 sheets of 1 mil film, reinforced in both directions with 500 denier polypropylene (PP) fiber, by using hot-melt adhesive to conjoin sides thereof as a lap seam 210. The product is estimated to be satisfactory in its general characteristics for this use.

EXAMPLE 2

The 2.5 mil bag of Example 1 is tested with 50 lbs. of granular polyethylene (PE) resin. The results are unacceptable in the 6-side drop test because the drop performance is merely 4 feet.

The bag is then manufactured with a fiber/film laminate made of 500 denier MD fibers and 1000 denier TD fiber. The drop performance increases from 4 feet to 8 feet, making the bag satisfactory for the resin market currently served in Europe by 8–9 mil PE bags and by 5 ply paper bags in the U.S. (one of the plys may be polyethylene).

EXAMPLE 3

Among 30 different mixes marketed by a large regional feed supplier, whole corn is regarded as the most difficult feed material to package safely. Fiber/film laminate bags are manufactured with 500 denier MD fibers and 1000 denier TD fibers. The edge drop distance is 3 feet and is unacceptable.

The bag is then manufactured with 1000 denier polypropylene fiber in the MD direction, and the resulting bag has an edge drop performance of 5 feet which is an acceptable height. This bag, comprising two 1-mil films plus 1-mil polypropylene fibers, is able to compete with a 4-mil all-polypropylene woven fiber bag for handling 100 lbs. of whole corn.

EXAMPLE 4

In the initial concept of the fiber/film laminate bag, it was felt that the loops at the laminate edge would add to the strength of the lap seam because in the event of a seam failure, each loop must pull through or out of the heat-sealed sandwich and thus should add to the overall strength of the lamp seam. There are more variables involved than simply loops vs. no loops; for example, fiber-to-film bond strength and the weight of hot melt adhesive used to form the loop seam have an important effect on overall seam strength. Furthermore, the type of hot-melt adhesive can make an important difference.

Referring hereinafter to FIGS. 19 and 20, a lap seam 210 is prepared from a fiber-reinforced composite film sheet made from co-extruded films 217,219,227,229 coextended from 80% low-density polyethylene (polyethylene 682 of Dow Chemical Co.) and a blend of 14% high-density polyethylene (polyethylene TR 130 of Phillips Petroleum Co.) and 6% polybutylene. The fiber/film laminate is prepared by placing the low-density polyethylene adjacent to fibers 211,221. The hot melt adhesive used for adhesive strips 216 is Munel 610 hot melt adhesive of Gulf Oil Co. The fiber-to-film bond strength is 5 lbs. per fiber inch of shear surface. TD fibers 213,223 are 0.375 inch apart, measured on centers.

Test samples are prepared by cutting one-inch wide strips from lap seam 210 in which the TD fibers are ⅜" apart. All testing is done with two fibers in each lap of the seam by selective cutting of the test samples to provide an enclosed loop between the two fibers. In the case where the loops of each sample side are offset, the sample is cut to provide two TD fibers on one side and three TD fibers on the other side. The loops have a one-inch overlap in the transverse direction.

The one-inch wide test samples are placed between the jaws of a tensile testing machine recording both stress and strain, with two inches of sample length exposed between the jaws. The results are given in the first line of Table I.

Nine samples are then cut from a lap seam 210 made with the same hot melt adhesive and the same film and fibers but with a different fiber adhesive furnishing 6.8 lbs. of bond strength per fiber inch of shear surface and with no loops within the same area. The results are given in the second line of Table I.

TABLE I

| Example No. | Loops/ No Loops | Bond Strength, Lbs. | Break Force, Lbs. $\bar{X}$ | $\sigma$ | $\eta$ | Elong. at Break, Inches |
|---|---|---|---|---|---|---|
| 4 | Loops | 5 | 11.6 | 1.8 | 9 | 0.64 |
| 4 | No Loops | 6.8 | 8.7 | 1.0 | 9 | 0.36 |
| 5 | Loops | 7.2 | 16.4 | 0.8 | 7 | 0.63 |
| 5 | No Loops | 8.1 | 17.2 | 0.9 | 10 | 0.69 |
| 6 | Loops | 9.3 | 17.8 | 1.3 | 6 | — |
| 6 | No Loops | 9.3 | 17.8 | 1.0 | 5 | — |

EXAMPLE 5

Another lap seam 210, made from coextruded film consisting of 80% of polyethylene 687 of Dow Chemical Co. and 20% of TR 130 high-density polyethylene of Phillips Petroleum Co., using a Goodrich hot melt adhesive and a fiber adhesive furnishing 7.2 lbs. bond strength for the loop samples and 8.1 lbs. bond strength for the samples without the loops, is similarly tested with the results as given in the third and fourth lines of Table I.

EXAMPLE 6

An additional lap seam 210, made from co-extruded film consisting of 80% low-density polyethylene 682 of Dow Chemical Co. and 20% of TR 130 of Phillips Petroleum Co., using Gulf 610 as a hot melt adhesive and an adhesive coating on the fibers which furnishes 9.3 lbs. of bond strength per fiber inch of shear surface, is similarly tested. The results are given in the fifth and sixth lines of Table I.

The conclusions from these tests of Examples 4–6 are as follows:

(1) With a low fiber-to-film strength (5 lbs. per fiber inch of shear surface), loops add approximately 30% to the force required to break the seam. This is a bond strength level that would be expected with 500 denier fiber, using typical fiber adhesive under the best conditions.

(2) With a higher bond strength of 7 to 8 lbs., there is no advantage for the loops over straight fiber because breaking force is the same in both cases. This is a level of bond strength that would be expected with a 1000 denier fiber under optimum conditions.

(3) Therefore, the advantages of the loop construction occurs: (a) when using narrower fiber widths and/or other fiber reinforcing materials such as monofilaments and multi-filaments, wherein the area for adhesive bond between the film and the fibers is substantially reduced from that obtainable with 1000 denier polypropylene fiber, and (b) as insurance or back-up protection for TD fibers of any denier, to protect against localized non-deposition or unanticipated failure of the fiber adhesive.

EXAMPLE 7

Samples of a 3-ply paper bag, a 6 mil bag made of low-density polyethylene (LDPE), a 9 mil LDPE bag and a woven 1000 denier polypropylene (PP) bag are cut to obtain samples of their sheet materials which are subjected to the following six sheet characterization tests:

Yield (ASTM D882) (expressed in lbs/inch of sample width) is a measurement of the force the material can take without permanent distortion and represents the static load carrying capability of the shipping sack material. The lesser of the MD and TD values is used.

Dart drop (ASTM D1709) measures in inch pounds the amount of energy required for a $1\frac{1}{2}''$ diameter, 2 lb. ball to pass through a clamped film sample. This test is to evaluate the film's ability to absorb shock loads such as bag drop.

PPT (ASTM D2582) test measures the length of a tear caused by a one-pound sharp projection which moves into and parallel to a 8-inch wide film sample after a 20-inch free drop. The result is converted to an average force in pounds required to make that length of tear. It is used as a measure of snag resistance. The lesser of the MD and TD values is used.

Elmendorf initiated tear (ASTM D1922) measures the average force in grams that it takes to propagate an initiated tear and is used to measure the film material's ability to prevent slight punctures from propagating to a large opening. The lesser of the MD and TD values is used.

Puncture measures the force in pounds that it takes a 0.937" diameter head to penetrate through a clamped film sample. It is used as a measure of resistance to a finger or blunt object puncture.

The 9 mil LDPE bag is a square-bottomed bag, made on a Windmiller Holsher machine, which is the standard bag in Europe.

The woven polypropylene bag is fabricated with sewn seams.

Then single samples of these commercial bags are also subjected to the following four performance tests:

The progressive end drop is used to evaluate the bag material, as this test orientation results in the most severe loads on a given material at a given drop height. The procedure is to start at 2 ft. and continue to drop the same bag at progressively greater heights at one foot increments til the bag breaks.

The progressive edge drop is used to check the bottom and top seams of the bag. At a given drop height, this test orientation results in the greatest loads on the end seams.

The 6-side drop is specified in the heavy duty plastic bag specification adopted by some shipping associations. In this test, a bag is dropped from a specified height, once on each end, once on each edge, and once on each face. Nine out of 10 bags should pass this test without failure.

The results of the six sheet characterization tests and the three bag performance tests are given in the first four columns of Table II.

EXAMPLE 8

A fiber-reinforced composite sheet 200 of this invention, more simply termed a fiber/film laminate having an overall thickness of 2.5 mil and an appearance as seen in FIGS. 18 and 19, is made from co-extruded film of one mil thickness, which comprises 25% high-density polyethylene (HDPE) and 75% of low-density polyethylene (LDPE), and from 500 denier MD and TD fibers. The laminate is subjected to the same six characterization tests.

Then the laminate is formed into a tube of indefinite length, having a lap seam 210 as seen in FIGS. 20 and 21, which is cut into suitable lengths for making shipping sacks. The lengths are sewn at their ends. They are subjected to the same three performance tests as in Example 7.

The sheet characterization and bag performance test data are given in the fifth column of Table II. The results indicate superior characteristics and performance in most categories.

EXAMPLE 9

The same procedure is used in making a fiber/film laminate having a 2.75 mil overall thickness, using the same co-extruded film but with 500 denier MD fibers and 1000 denier TD fiber.

The same characterization and performance tests are performed as in Examples 7 and 8. The data are given in the sixth column of Table II. It is apparent that the laminate has equivalent properties to the material used for the 9 mil LDPE bag, although drop performance is not quite as good.

TABLE II

|  |  | COMMERCIAL BAGS | | | | FIBER/FILM LAMINATES | | |
| --- | --- | --- | --- | --- | --- | --- | --- | --- |
| Overall Film-Plus-Fiber Thickness |  | 3 Ply (150 Lb Paper) | 6 Mil LDPE | 9 Mil LDPE | 4 Mil Woven PP ($3\frac{1}{2}$ oz/yd$^2$) | 2.5 Mil LD/HD | 2.75 Mil LD/HD | 3.0 Mil LD/HD |
| Film Composition Deniers of MD/TD Fibers |  | — | — | — | 1000/750 | 500/500 | 500/1000 | 1000/1000 |
| Fiber Material |  | — | — | — | PP | PP | PP | PP |
| Example No. |  | 7 | 7 | 7 | 7 | 8 | 9 | 10 |
| Material Tests: | ASTM No. |  |  |  |  |  |  |  |
| Yield, lbs/in | D882 | 45 | 9 | 11 | 100 | 20 | 20 | 30 |
| Dart Drop, in-lbs* | D1709 | 13 | 45 | 60 | 60 | 45 | 60 | 60 |
| PPT, lbs* | D2582 | 7.5 | 11 | 22 | 28 | 13 | 13 | 15 |
| Tear, grams* | D1922 | 180 | 350 | 700 | N/A | 700 | 700 | 800 |
| Puncture, lbs | — | 39 | 37 | 71 | N/A | 42 | 54 | 58 |
| Bag Performance Tests: |  |  |  |  |  |  |  |  |
| End Drop, Height in ft/wt in lbs at Break |  | 2/35** | 10/35** | 10/55** | 5/100*** | 5/50** | 8/50** 5/100*** | 5/100*** |

TABLE II-continued

| | | | | | | |
|---|---|---|---|---|---|---|
| Edge Drop, Height in ft/wt in lbs at Break | — | — | — | 6/100* | — | 8/50<br>4/100* | 6/100* |
| 6 Side Drop, Height in ft/wt in lbs, with No Damage | — | — | 10/55 | 4/100*** | 4/50** | 8/50**<br>4/100* | 4/100*** |

*Lower of MD or TD Values
**LDPE Resin
***Whole Corn
N/A Not Applicable

EXAMPLE 10

The same procedure is used in making a fiber/film laminate having an overall thickness of 3.0 mil, using the same co-extruded film but with 1000 denier MD and TD fibers.

The same sheet characterization and bag performance tests are performed as in Examples 7–9. The results are listed in the last column of Table II. It is evident that this fiber/film laminate has equivalent performance to the woven PP bag. The sewn seam is the weak point of the woven PP bag.

What is claimed is:

1. A continuous method for manufacturing a fiber-reinforced composite sheet material having continuous high strength properties and light weight, comprising:
   A. continuously drawing a plurality of MD fibers from a supply thereof;
   B. passing said MD fibers in longitudinally forward movement through a comb and forming a first planar lap of parallel, longitudinally aligned strands;
   C. drawing a single TD fiber from a supply thereof at a high linear velocity;
   D. passing said single TD fiber between spindles within an interweaving section of a pair of endless, spindle-equipped chains which cooperatively comprise said interweaving section, a diverging section, and a parallel section, said pair of chains revolving in opposite directions in a pair of planar patterns which are parallel to said first planar lap to form a pair of inward sides moving forwardly in mutually facing relationship and a pair of outward sides moving rearwardly;
   E. engaging said single TD fiber around said successively interweaving spindles to form a successive plurality of closely spaced loops when each said spindle of one said chain pulls said TD fiber toward and beyond the previously passing spindle of the other said chain;
   F. laterally extending said single fiber, by longitudinal movement of said inward sides through said diverging section, to separate said plurality of loops and form a plurality of closely spaced TD fibers which are transversely disposed to said longitudinally aligned MD fibers and connected by said plurality of loops;
   G. continuing to move said transversely disposed TD fibers through said parallel section of said pair of chains;
   H. drawing a pair of films from a supply thereof;
   I. forwardly passing said pair of films in straddling and parallel relationship to said plurality of longitudinally extending fibers and said plurality of transversely disposed loops;
   J. withdrawing said spindles from said loops; and
   K. laminating said longitudinally extending fibers, said transversely disposed loops, and said pair of films to form said composite sheet.

2. The method of claim 1, wherein said pair of films are formed by flattening a tube of extruded film, drawn from a roll thereof as said supply of step H, and slitting the flattened tube at the sides thereof.

3. The method of claim 2, wherein each of said films is passed over a turning bar, whereby said drawing of step H and said forwardly passing of step I are perpendicularly related.

4. The method of claim 2, wherein said films are transversely stretched, by passage through a lateral expansion means, after said slitting.

5. The method of claim 4, wherein a strip on each side of said pair of films is laminated inwardly of said loops for holding said transversely disposed TD fibers in place before said withdrawing of step J.

6. The method of claim 5, wherein said strip laminating is done by two pairs of opposed heated rolls.

7. The method of claim 1, wherein said withdrawing of step J in claim 1 is performed by a pair of cams which lift said loops over said spindles.

8. The method of claim 1, wherein said edge-laminated films are smoothed by two pairs of transversely disposed brushes and are tranversely streched by two pairs of short Mt. Hope rolls.

9. The method of claim 8, wherein said laminating is performed by a pair of heated rolls.

10. The method of claim 9, wherein said composite sheet is formed into a roll by passing said sheet over a winder.

11. The method of claim 2, wherein said extruded films are co-extrusions of high-density and low-density polyethylene.

12. The method of claim 11, wherein said high-density polyethylene is 25% of said film by weight.

13. The method of claim 12, wherein said low-density polyethylene is adjacent to said fibers.

14. The method of claim 13, wherein said fibers are coated with a heat-sensitive adhesive.

15. The method of claim 1, wherein said MD and TD fibers are monofilaments.

16. The method of claim 1, wherein said MD and TD fibers are MD-oriented polypropylene tape.

17. The method of claims 15 or 16, wherein said polypropylene is co-extruded with low-density polyethylene, whereby lamination between MD and TD fibers and between said fibers and said film requires no adhesive.

18. An apparatus for manufacturing a fiber-reinforced film sheet, comprising:
   A. a machine-direction multi-fiber feeding assembly;
   B. a transverse-direction single-fiber feeding assembly;
   C. a chain system for forming said single fiber into a plurality of transverse-direction reaches which are connected by loops at the ends thereof and move sidewise in the machine direction at the same speed as said machine-direction fibers;

D. a film feeding assembly for a pair of co-extruded films of indeterminate length;
E. a converging assembly for said machine-direction and transverse-direction fibers and said pair of films to form a fiber/film sandwich;
F. a high-temperature nip roll system for laminating said fiber/film sandwich together to form said fiber-reinforced film sheet; and
G. a winder for winding said laminated fiber-reinforced film sheet into a roll;
H. a pair of expander rolls for smoothing and widening said pair of films in the transverse direction, prior to reaching said converging assembly; and
I. an edge sealing assembly for heat sealing said pair of co-extruded films to said transverse direction reaches within a strip which is disposed close to said loops at each edge but inwardly of said loops, whereby said fiber/film sandwich is conjoined within said two strips.

19. The apparatus of claim 18, wherein said chain system comprises a plurality os spindles on which said loops are held.

20. The apparatus of claim 19, wherein said plurality of spindles lies within a common plane.

21. The apparatus of claim 20 which further comprises a cam means for lifting each row of said loops from said spindles after passing said edge sealing assembly.

22. The apparatus of claim 21 which further comprises an elevating means for directing said fiber/film sandwich obliquely to said plane.

23. The apparatus of claim 22, which further comprises two pairs of edge pulling rolls, whereby said lifted film sandwich is stretched in the transverse direction before reaching said high-temperature nip roll system.

* * * * *